(12) United States Patent
Shahparnia et al.

(10) Patent No.: US 9,898,121 B2
(45) Date of Patent: Feb. 20, 2018

(54) INTEGRATED CAPACITIVE SENSING AND DISPLAYING

(75) Inventors: Shahrooz Shahparnia, Campbell, CA (US); Imre Knausz, Fairport, NY (US); Joseph Kurth Reynolds, Mountain View, CA (US)

(73) Assignee: Synaptics Incorporated, San Jose, CA (US)

( * ) Notice: Subject to any disclaimer, the term of this patent is extended or adjusted under 35 U.S.C. 154(b) by 1223 days.

(21) Appl. No.: 12/772,012

(22) Filed: Apr. 30, 2010

(65) Prior Publication Data

US 2011/0267305 A1 Nov. 3, 2011

(51) Int. Cl.
*G06F 3/041* (2006.01)
*G06F 3/044* (2006.01)
*G02F 1/1333* (2006.01)

(52) U.S. Cl.
CPC ............ *G06F 3/0416* (2013.01); *G06F 3/044* (2013.01); *G06F 3/0412* (2013.01); *G02F 2001/133331* (2013.01); *G06F 2203/04101* (2013.01)

(58) Field of Classification Search
None
See application file for complete search history.

(56) References Cited

U.S. PATENT DOCUMENTS

| | | | |
|---|---|---|---|
| 5,093,655 A | 3/1992 | Tanioka et al. | |
| 5,392,058 A | 2/1995 | Tagawa | |
| 5,534,892 A | 7/1996 | Tagawa | |
| 5,896,120 A | 4/1999 | Iguchi et al. | |
| 5,923,320 A * | 7/1999 | Murakami | G06F 3/044 345/173 |

(Continued)

FOREIGN PATENT DOCUMENTS

| | | |
|---|---|---|
| CN | 1940842 | 4/2007 |
| CN | 101051256 | 10/2007 |

(Continued)

OTHER PUBLICATIONS

ISA/KR, International Search Report and Written Opinion for International Application No. PCT/US2011/032177, 3 pages, dated Dec. 26, 2011 (Dec. 26, 2011).

(Continued)

*Primary Examiner* — Amr Awad
*Assistant Examiner* — Andre Matthews
(74) *Attorney, Agent, or Firm* — Osha Liang LLP

(57) ABSTRACT

A display device having an integrated capacitive proximity sensor comprises a plurality of sensor electrodes disposed as part of a display element of the display device. The plurality of sensor electrodes is configured for performing both sensor and display functions of the display device. The display device also comprises a sensor drive mechanism coupled with the plurality of sensor electrodes and configured for driving a first electrical signal on a first at least one sensor electrode of the plurality of sensor electrodes. The sensor drive mechanism comprises at least one memory element that is configured for selecting drive excitation information for the first at least one sensor electrode. The display device also comprises a display drive mechanism coupled with the plurality of sensor electrodes and configured for driving a second electrical signal on a second least one sensor electrode of the plurality of sensor electrodes.

17 Claims, 18 Drawing Sheets

(56) References Cited

U.S. PATENT DOCUMENTS

| | | | |
|---|---|---|---|
| 6,219,113 B1 | 4/2001 | Takahara | |
| 6,239,788 B1* | 5/2001 | Nohno et al. | 345/173 |
| 6,560,276 B1 | 5/2003 | Long et al. | |
| 7,031,886 B1 | 4/2006 | Hargreaves | |
| 7,193,601 B2 | 3/2007 | Furuya | |
| 7,557,834 B2 | 7/2009 | Kaneko et al. | |
| 7,633,566 B2 | 12/2009 | Utsunomiya et al. | |
| 7,792,220 B2 | 9/2010 | Alderson et al. | |
| 8,027,417 B2 | 9/2011 | Jia et al. | |
| 8,040,326 B2 | 10/2011 | Hotelling et al. | |
| 8,174,589 B2 | 5/2012 | Ise | |
| 8,576,161 B2 | 11/2013 | Chang et al. | |
| 8,643,624 B2 | 2/2014 | Day et al. | |
| 2004/0095336 A1 | 5/2004 | Hong | |
| 2004/0104881 A1 | 6/2004 | Furuya | |
| 2004/0217945 A1 | 11/2004 | Miyamoto et al. | |
| 2004/0239338 A1 | 12/2004 | Jonsson et al. | |
| 2005/0135492 A1 | 6/2005 | Jia et al. | |
| 2006/0012575 A1 | 1/2006 | Knapp et al. | |
| 2006/0013507 A1 | 1/2006 | Kaneko et al. | |
| 2006/0114247 A1 | 6/2006 | Brown | |
| 2007/0074914 A1 | 4/2007 | Geaghan et al. | |
| 2007/0182723 A1 | 8/2007 | Imai et al. | |
| 2007/0262966 A1 | 11/2007 | Nishimura et al. | |
| 2008/0018581 A1 | 1/2008 | Park et al. | |
| 2008/0048989 A1 | 2/2008 | Yoon et al. | |
| 2008/0055267 A1 | 3/2008 | Wu et al. | |
| 2008/0062139 A1 | 3/2008 | Hotelling et al. | |
| 2008/0062140 A1 | 3/2008 | Hotelling et al. | |
| 2008/0062147 A1 | 3/2008 | Hotelling et al. | |
| 2008/0062148 A1 | 3/2008 | Hotelling et al. | |
| 2008/0144743 A1 | 6/2008 | Alderson et al. | |
| 2008/0150901 A1 | 6/2008 | Lowles et al. | |
| 2008/0158167 A1 | 7/2008 | Hotelling et al. | |
| 2008/0180407 A1 | 7/2008 | Utsunomiya et al. | |
| 2008/0309625 A1 | 12/2008 | Krah et al. | |
| 2008/0309627 A1 | 12/2008 | Hotelling et al. | |
| 2008/0309628 A1 | 12/2008 | Krah et al. | |
| 2009/0009194 A1 | 1/2009 | Seguine | |
| 2009/0079707 A1 | 3/2009 | Kaehler et al. | |
| 2009/0160461 A1 | 6/2009 | Zangl et al. | |
| 2009/0195511 A1 | 8/2009 | Cites et al. | |
| 2009/0207154 A1 | 8/2009 | Chino | |
| 2009/0256818 A1 | 10/2009 | Noguchi et al. | |
| 2010/0001973 A1 | 1/2010 | Hotelling et al. | |
| 2010/0019780 A1 | 1/2010 | Bulea | |
| 2010/0045635 A1 | 2/2010 | Soo | |
| 2010/0053380 A1 | 3/2010 | Ise | |
| 2010/0060591 A1 | 3/2010 | Yousefpor et al. | |
| 2010/0066692 A1 | 3/2010 | Noguchi et al. | |
| 2010/0085324 A1 | 4/2010 | Noguchi et al. | |
| 2010/0110040 A1 | 5/2010 | Kim et al. | |
| 2010/0182273 A1 | 7/2010 | Noguchi et al. | |
| 2010/0193257 A1 | 8/2010 | Hotelling et al. | |
| 2010/0194695 A1 | 8/2010 | Hotelling et al. | |
| 2010/0194696 A1 | 8/2010 | Chang et al. | |
| 2010/0194697 A1 | 8/2010 | Hotelling et al. | |
| 2010/0194698 A1 | 8/2010 | Hotelling et al. | |
| 2010/0214262 A1 | 8/2010 | Ishizaki et al. | |
| 2010/0225612 A1 | 9/2010 | Ishizaki et al. | |
| 2010/0265210 A1 | 10/2010 | Nakanishi et al. | |
| 2010/0289765 A1 | 11/2010 | Noguchi et al. | |
| 2010/0295804 A1 | 11/2010 | Takeuchi et al. | |
| 2010/0295824 A1 | 11/2010 | Noguchi et al. | |
| 2010/0302202 A1 | 12/2010 | Takeuchi et al. | |
| 2010/0309162 A1 | 12/2010 | Nakanishi et al. | |
| 2010/0321305 A1 | 12/2010 | Chang et al. | |
| 2010/0328239 A1 | 12/2010 | Harada et al. | |
| 2010/0328255 A1 | 12/2010 | Ishizaki et al. | |
| 2010/0328256 A1 | 12/2010 | Harada et al. | |
| 2010/0328257 A1 | 12/2010 | Noguchi et al. | |
| 2010/0328259 A1 | 12/2010 | Ishizaki et al. | |
| 2010/0328274 A1 | 12/2010 | Noguchi et al. | |
| 2010/0328291 A1 | 12/2010 | Ishizaki et al. | |
| 2011/0042152 A1 | 2/2011 | Wu | |
| 2011/0050585 A1 | 3/2011 | Hotelling et al. | |
| 2011/0063993 A1 | 3/2011 | Wilson et al. | |
| 2011/0084857 A1 | 4/2011 | Marino et al. | |
| 2011/0084918 A1 | 4/2011 | Sung | |
| 2011/0102361 A1* | 5/2011 | Philipp | 345/174 |
| 2011/0210939 A1 | 9/2011 | Reynolds et al. | |
| 2011/0210940 A1 | 9/2011 | Reynolds | |
| 2011/0210941 A1 | 9/2011 | Reynolds et al. | |
| 2011/0267305 A1 | 11/2011 | Shahparnia et al. | |
| 2015/0302831 A1 | 10/2015 | Reynolds | |

FOREIGN PATENT DOCUMENTS

| | | |
|---|---|---|
| CN | 101051256 A | 10/2007 |
| CN | 101305338 A | 11/2008 |
| CN | 100583707 C | 1/2010 |
| CN | 102053751 A | 5/2011 |
| EP | 1892605 | 2/2008 |
| EP | 1936479 | 6/2008 |
| EP | 2330493 | 6/2011 |
| JP | 08106358 A2 | 4/1996 |
| JP | 11305932 A2 | 11/1999 |
| JP | 2006-106853 | 4/2006 |
| JP | 2007-334606 | 12/2007 |
| JP | 2008-090623 | 4/2008 |
| JP | 2009054141 A | 3/2009 |
| JP | 2009244958 A | 10/2009 |
| JP | 2009244958 A2 | 10/2009 |
| JP | 2009258182 A2 | 11/2009 |
| JP | 2009540374 A | 11/2009 |
| JP | 2010-072581 | 4/2010 |
| KR | 10-2008-0012594 | 2/2008 |
| KR | 1020080012594 A | 2/2008 |
| KR | 10-2010-0007717 | 1/2010 |
| TW | 200945147 | 11/2009 |
| WO | 2001027868 A1 | 4/2001 |
| WO | WO-01/27868 | 4/2001 |
| WO | WO-03019346 | 3/2003 |
| WO | WO-2004/046905 | 6/2004 |
| WO | WO-2006/054585 | 5/2006 |
| WO | WO 2007/003108 | 1/2007 |
| WO | WO-2007/012256 | 2/2007 |
| WO | WO-2007/102238 | 9/2007 |
| WO | WO-2008/050507 | 5/2008 |
| WO | WO-2010/009655 | 1/2010 |
| WO | WO 2010/137727 | 12/2010 |

OTHER PUBLICATIONS

Office Action for U.S. Appl. No. 13/034,696, dated Sep. 20, 2013, 24 pages.

Notice of Allowance for U.S. Appl. No. 12/726,322, dated Sep. 24, 2013, 19 pages.

Chen, et al., "Partial Human Translation of Wipo Publication WO-2007/012256-A1", Jan. 2, 2007.

JPO Office Action for P2015-160604, Jun. 28, 2016, 8 pgs.

Office Action for U.S. Appl. No. 13/034,696, dated May 31, 2013, 22 pages.

Office Action, U.S. Appl. No. 13/034,679 dated Jun. 26, 2013, 25 pages.

Office Action, U.S. Appl. No. 14/788,267 dated Sep 10, 2015, 32 pages.

Office Action, U.S. Appl. No. 14/788,267 dated Sep. 10, 2015, 32 pages.

Office Action Search Report for CN Application No. 201180021254.6, dated Nov. 4, 2015, 3 Pages.

Office Action, U.S. Appl. No. 13/034,687, dated Jun. 24, 2014, 32 pages.

Office Action, JP Application No. 2013-507988 , 6 pages, dated Mar. 3, 2015.

Office Action Search Report, CN Application No. 201180021590.0, 2 pages, dated Dec. 17, 2015 (Dec. 17, 2015).

Office Action, JP Application No. 2012-555162, 7 pages, dated Jan. 27, 2015 (Jan. 27, 2015).

(56) References Cited

OTHER PUBLICATIONS

Office Action, U.S. Appl. No. 14/788,267, dated Jan. 4, 2016, 30 pages.

\* cited by examiner

1300

```
RECEIVE A SENSOR DRIVE SIGNAL FOR DRIVING A FIRST AT LEAST ONE
SENSOR ELECTRODE OF A PLURALITY OF SENSOR ELECTRODES, WHEREIN
THE PLURALITY OF SENSOR ELECTRODES IS DISPOSED AS A PART OF A
DISPLAY ELEMENT OF A DISPLAY DEVICE AND IS CONFIGURED FOR
PERFORMING BOTH SENSOR FUNCTIONS AND DISPLAY FUNCTIONS OF THE
DISPLAY DEVICE.
1310
```

↓

```
RECEIVE A DISPLAY DRIVE SIGNAL FOR DRIVING A SECOND AT LEAST ONE
SENSOR ELECTRODE OF THE PLURALITY OF SENSOR ELECTRODES.
1320
```

↓

```
ARBITRATE BETWEEN THE DISPLAY DRIVE SIGNAL AND THE SENSOR DRIVE
SIGNAL SUCH THAT THE DISPLAY DRIVE SIGNAL AND THE SENSOR DRIVE
SIGNAL ARE NOT SIMULTANEOUSLY DRIVEN ON ANY SENSOR ELECTRODE OF
THE PLURALITY OF SENSOR ELECTRODES.
1330
```

```
INHIBIT THE SENSOR DRIVE SIGNAL FROM BEING DRIVEN ON A GUARDED SET
OF THE PLURALITY OF SENSOR ELECTRODES.
1340
```

```
CONTROL POLARITY OF THE SENSOR DRIVE SIGNAL.
1350
```

```
DRIVE A SENSE SIGNAL ON A FIRST AT LEAST ONE SENSOR
ELECTRODE OF A PLURALITY OF SENSOR ELECTRODES, WHEREIN THE
PLURALITY OF SENSOR ELECTRODES IS CONFIGURED FOR PERFORMING
BOTH SENSOR FUNCTIONS AND DISPLAY FUNCTIONS OF A DISPLAY DEVICE,
WHEREIN THE SENSE SIGNAL IS DRIVEN BY A SENSOR DRIVE MECHANISM
COMPRISING A MEMORY ELEMENT, WHEREIN THE SENSOR DRIVE MECHANISM
IS COUPLED WITH THE FIRST AT LEAST ONE SENSOR ELECTRODE OF THE
PLURALITY OF SENSOR ELECTRODES, AND WHEREIN THE MEMORY ELEMENT
IS CONFIGURED FOR SELECTING DRIVE EXCITATION INFORMATION FOR THE
FIRST AT LEAST ONE SENSOR ELECTRODE.
1410
```

```
DRIVE A DISPLAY SIGNAL ON A SECOND SENSOR ELECTRODE OF THE
PLURALITY OF SENSOR ELECTRODES, WHEREIN THE DISPLAY SIGNAL IS
DRIVEN BY A DISPLAY DRIVE MECHANISM COUPLED WITH THE SECOND
SENSOR ELECTRODE.
1420
```

```
ARBITRATE BETWEEN THE DISPLAY SIGNAL AND THE SENSE SIGNAL SUCH
THAT THE DISPLAY SIGNAL AND THE SENSE SIGNAL ARE NOT
SIMULTANEOUSLY DRIVEN ON ANY SENSOR ELECTRODE OF THE PLURALITY
OF SENSOR ELECTRODES.
1430
```

```
INHIBIT THE SENSE SIGNAL FROM BEING DRIVEN ON A GUARDED SET OF THE
PLURALITY OF SENSOR ELECTRODES.
1440
```

```
CONTROL POLARITY OF THE SENSE SIGNAL.
1450
```

```
FORM A PLURALITY OF SENSOR ELECTRODES AS PART OF A DISPLAY
ELEMENT OF A DISPLAY DEVICE, WHEREIN THE PLURALITY OF SENSOR
ELECTRODES IS CONFIGURED FOR PERFORMING BOTH SENSOR FUNCTIONS
AND DISPLAY FUNCTIONS OF THE DISPLAY DEVICE
1510
```
↓
```
DISPOSE A SENSOR DRIVE MECHANISM AS PART OF THE DISPLAY ELEMENT,
THE SENSOR DRIVE MECHANISM COUPLED WITH THE PLURALITY OF SENSOR
ELECTRODES AND CONFIGURED FOR DRIVING A FIRST ELECTRICAL SIGNAL
ON A FIRST AT LEAST ONE SENSOR ELECTRODE OF THE PLURALITY OF
SENSOR ELECTRODES, WHEREIN THE SENSOR DRIVE MECHANISM
COMPRISES AT LEAST ONE MEMORY ELEMENT CONFIGURED FOR SELECTING
DRIVE EXCITATION INFORMATION FOR THE FIRST LEAST ONE SENSOR
ELECTRODE
1520
```
↓
```
DISPOSE A DISPLAY DRIVE MECHANISM AS PART OF THE DISPLAY
ELEMENT, THE DISPLAY DRIVE MECHANISM COUPLED WITH A SECOND A
LEAST ONE SENSOR ELECTRODE OF THE PLURALITY OF SENSOR
ELECTRODES AND CONFIGURED FOR DRIVING A SECOND ELECTRICAL
SIGNAL ON THE SECOND AT LEAST ONE SENSOR ELECTRODE.
1530
```

FIG. 15A

INTEGRATED CAPACITIVE SENSING AND DISPLAYING

CROSS REFERENCE TO RELATED U.S. APPLICATION

This application is related to, Ser. No. 12/726,322, entitled "CAPACITIVE SENSING USING A SEGMENTED COMMON VOLTAGE ELECTRODE OF A DISPLAY," with filing date Mar. 17, 2010 and assigned to the assignee of the present invention, which is herein incorporated by reference in its entirety.

BACKGROUND

Displays, such as Liquid Crystal Displays and Organic Light Emitting Diode displays, are used in many of electronic devices in order to display graphics, text, pictures, and the like which may be generically considered as the display of information. In many uses, capacitive sensors, such as capacitive touch panels, are implemented in conjunction with these displays to form capacitive touch screens. A user can interact with a capacitive sensor arranged over the display to select, manipulate, or take some action with regard to the displayed information or make an input or selection with respect to an electronic device on which the capacitive sensor is implemented. One such example is a capacitive touch panel that covers a display of a tablet personal computer. Another is the capacitive touch panel that covers a display of a digital camera. Still another example is a capacitive touch panel that covers a display of a smart phone.

It is appreciated that the conventional construction of many such capacitive touch screens involves fabricating a display (such as an LCD), consisting of multiple layers of material, and then adding an additional substrate to the stack of the display layers to implement a capacitive sensor on top of the display. For example, and with respect to an LCD, this typically involves applying an optically clear adhesive to attach a sheet of glass or other clear substrate to the top surface of the LCD, the top surface being the surface through which a user views the LCD. The capacitive sensor is implemented on this additional layer, such as by patterning optically clear electrodes on it.

BRIEF DESCRIPTION OF THE DRAWINGS

The accompanying drawings, which are incorporated in and form a part of the Description of Embodiments, illustrate various embodiments of the present invention and, together with the Description of Embodiments, serve to explain principles discussed below. The drawings referred to in this Brief Description of Drawings should not be understood as being drawn to scale unless specifically noted.

FIG. 13 is a flow diagram of an example method of integrated capacitive sensing and displaying, according to an embodiment.

FIG. 14 is a flow diagram of an example method of integrated capacitive sensing and displaying, according to an embodiment.

FIGS. 15A and 15B illustrate a flow diagram of an example method of creating a display device having an integrated capacitive proximity sensor, according to an embodiment.

DESCRIPTION OF EMBODIMENTS

Figure 1:
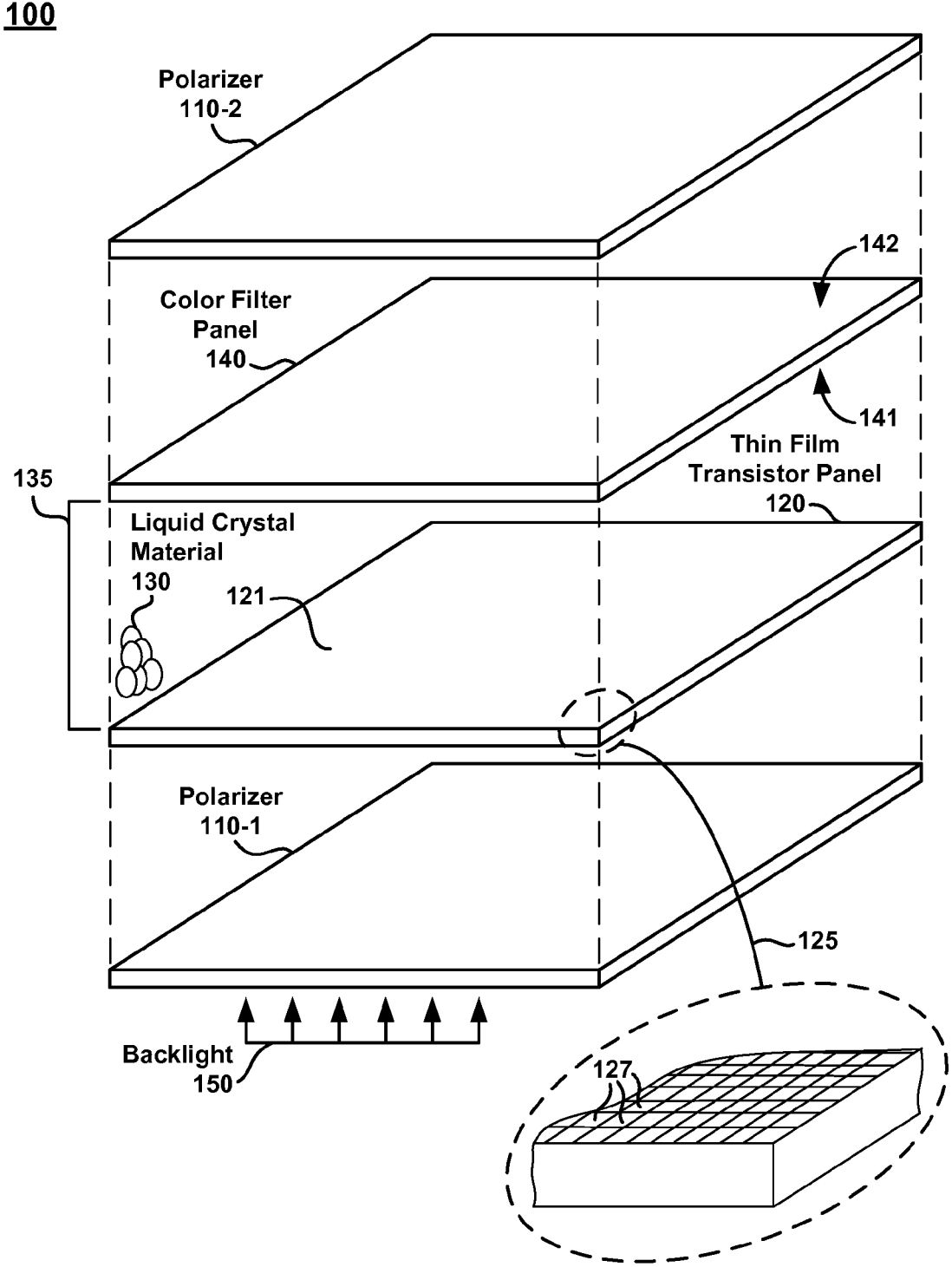
FIG. 1 is an exploded view of the stacked layers of an example Liquid Crystal Display (LCD), according to an embodiment.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail so as to not unnecessarily obscure aspects of the described embodiments.

Overview of Discussion

Typical conventional capacitive touch screens are constructed from a separate display and capacitive sensor, which are then joined together such as by attaching the capacitive sensor to the display with an optically clear adhesive. Additionally, in typical conventional approaches, the display, such as a Liquid Crystal Display (LCD), contains a common voltage (Vcom) electrode that is separate from the drive electrodes for the capacitive sensor.

As an example, some capacitive implementations utilize transcapacitive sensing methods based on the capacitive coupling between electrodes. Transcapacitive sensing methods are sometimes also referred to as "mutual capacitance sensing methods." In one embodiment, a transcapacitive sensing method operates by detecting the electric field coupling one or more transmitting (drive) electrodes with one or more receiving electrodes. Proximate objects may cause changes in the electric field, and produce detectable changes in the transcapacitive coupling. Sensor electrodes may drive as well as receive, either simultaneously or in a time multiplexed manner.

Sensor electrodes that drive are sometimes referred to as the "transmitting sensor electrodes," "driving sensor electrodes," "transmitters," "drive electrodes" or "drivers"—at least for the duration when they are driving. Other names may also be used, including contractions or combinations of the earlier names (e.g., "driving electrodes" and "driver electrodes." Sensor electrodes that receive are sometimes referred to as "receiving sensor electrodes," "receiver electrodes," or "receivers"—at least for the duration when they are receiving. Similarly, other names may also be used, including contractions or combinations of the earlier names.

Transcapacitive sensing schemes may detect changes in capacitive coupling between drive electrodes and receiver sensor electrodes when an object such as a human digit or a stylus is brought near. When the sensor comprises multiple drive electrodes or multiple receiver sensor electrodes, multiple capacitive couplings are formed in a spatially distributed fashion. A set of measurements of such multiple capacitive couplings is often referred to as a "frame", an "image", or a "capacitive image". Such an image represents the magnitudes of the capacitive couplings during a particular period of time. Successive images represent the magnitudes of the capacitive couplings during successive periods of time. Such successive images can be used to track the motions of objects in time as they move throughout a sensing region. The rate at which successive images are captured is known as the capacitive sensor frame rate.

Herein, methods and devices for integrated capacitive sensing and displaying are described. As will be described, the Vcom electrode of the display of this device is segmented and is employed for a dual use as both the Vcom electrode of the display and as the drive electrodes for a transcapacitive sensor. The specification will concentrate on describing circuitry and logic for driving both the display and the capacitive sensor in an integrated manner.

Discussion will begin with a description of an exploded view of the layers of an example LCD, according to an embodiment. Each of the layers will be briefly described. Discussion will continue with a description of an example implementation of a segmented Vcom electrode and driving requirements for such a segmented e Vcom electrode. Several non-limiting examples of a display device having an integrated capacitive proximity sensor and including circuitry/logic for integrating drive of the display and of the capacitive touch sensing will be described. Operation and creation of the display device having an integrated capacitive proximity sensor will be further described in conjunction with description of some example methods of integrated capacitive sensing and displaying and with description of a method of creating a display device having an integrated capacitive proximity sensor.

Example Display Construction and Operation

FIG. 1 is an exploded view of the stacked layers of an example Liquid Crystal Display (LCD) 100, according to an embodiment. An LCD is utilized in this description for purposes of example and not of limitation. Thus, it is appreciated that the principles described herein with respect to LCDs (including Active Matrix Liquid Crystal displays and Low Temperature Silicon Liquid Crystal Displays) are applicable to and extensible to other types of displays such as Organic Light Emitting Diode (OLED) displays, among others. In one embodiment, LCD 100 is a thin film transistor LCD. LCD 100 comprises a color filter panel 140, liquid crystal material 130, and a thin film transistor (TFT) panel 120 that are all located between polarizer 110-2 and polarizer 110-1. LCD 100 is backlit with a backlight 150 through its bottom layer, polarizer 110-1, and is viewed by a user through polarizer 110-2 which can be considered the top. TFT panel 120 and color filter panel 140 are sheets of glass (or other optically clear substrates) with the liquid crystal material 130 inserted and sealed between them in region 135. Polarizing filters (110-1, 110-2) on the two outer surfaces determine the polarization of light transmitted through the entire module of LCD 100, so that an electric field across liquid crystal material 130 can control the amount light transmitted through the LCD 100 from below by backlight 150. The details of how the polarized light interacts with liquid crystal material 130 are not relevant to the embodiments described here.

As shown by detail 125 of FIG. 1, TFT panel 120 is patterned with an array 127 of pixel transistors and transparent pixel electrodes on its upper surface 121, adjacent to liquid crystal material 130. In color LCDs, groups of pixel-sized red, green, and blue filters on color filter panel 140 are located above groups of three adjacent pixels. Sometimes these individual colored pixels, made up of a pixel transistor and a pixel electrode, are referred to as "sub-pixels," and each group of three is simply referred to as a "display pixel". The gates of the pixel transistors are driven by row wires traversing TFT panel 120, such that all of the gates of the pixel transistors in a single row are driven by the same row wire. A group of display pixels in such a row is referred to herein as a "pixel row." Similarly, column wires connect to the source terminals of the pixel transistors, such that all of the source terminals of the pixel transistors in a single column are driven by the same column wire. Each pixel electrode can be driven to a desired voltage by enabling its pixel transistor via an appropriate voltage on the corresponding row wire and driving the desired voltage onto the corresponding column wire.

In a conventional embodiment, color filter panel 140 contains a single "common" transparent electrode on its lower surface 141, adjacent to liquid crystal material 130, and no electrodes on its upper surface 142. This common electrode spans the entire display area and is driven with a voltage, typically referred to as "Vcom", and the common electrode is sometimes referred to as the Vcom electrode. Each individual pixel electrode voltage on TFT panel 120, in combination with the Vcom voltage on the Vcom electrode, creates an electric field across a local region of liquid crystal material 130, thus controlling the transparency of a single display pixel. As will be described further herein, this conventional arrangement is modified herein to segment the Vcom electrode into a plurality of common voltage electrode segments.

In operation, an LCD 100 is typically refreshed one row at a time, by driving the desired row wire and then driving the desired pixel voltages for that row onto all of the column wires at the same time. Once the row has been refreshed, the next row wire is selected and the process repeats until the entire display frame of LCD 100 has been refreshed.

In some embodiments, the Vcom electrode is often alternated in voltage so that alternating pixel rows of the display pixels are driven with fields of alternating polarity, in a scanning method known as row inversion. On alternate frames, the polarities of the even and odd pixel rows are reversed, so that over time the average voltage across each pixel sums to zero.

Example Segmented Common Voltage Electrode

Figure 2A:
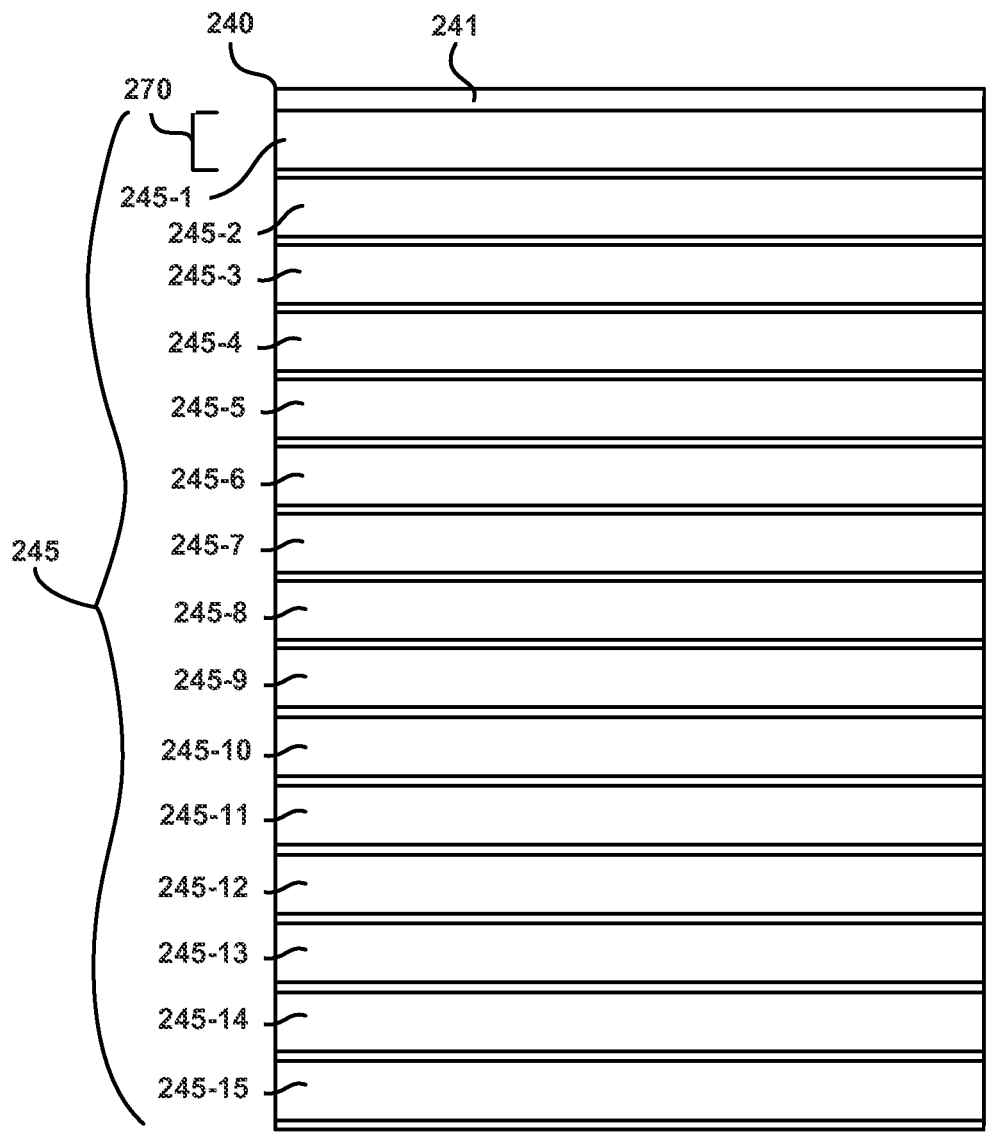
FIG. 2A is a plan view of an example substrate that includes a segmented common voltage (Vcom) electrode, according to an embodiment.

FIG. 2A is a plan view of substrate 240 that includes a segmented common voltage (Vcom) electrode 245, according to an embodiment. In one embodiment, substrate 240 is a substrate in the stack up of a display. For example, in one embodiment, substrate 240 is a color-filter panel, such as color filter panel 140 of FIG. 1. Vcom electrode 245 has been segmented into a plurality of horizontal segments (common voltage electrode segments 245-1 through 245-15 in the illustrated example). In one embodiment, each of the common voltage electrode segments (245-1 through 245-15) comprises an elongated shape, and the elongated shapes are substantially parallel to one another. In one embodiment, each segment, such as common voltage electrode segment 245-1, may have sufficient size to span or overlap more than one row of pixels (micro-row). Thus, the total number of segments of a segmented Vcom electrode can be smaller than the number of display pixel rows in some embodiments. It is appreciated that in one embodiment, the common voltage electrode segments (e.g., 245-1 through 245-15 in FIG. 2a) of a display comprise a plurality of rows of drive transistors, as will be described further in conjunction with FIG. 7. As will be described, one or more rows of the drive transistors (but less than all rows) can be driven together for capacitive sensing while simultaneously driving one or more other rows for display refreshing.

Figure 2B:
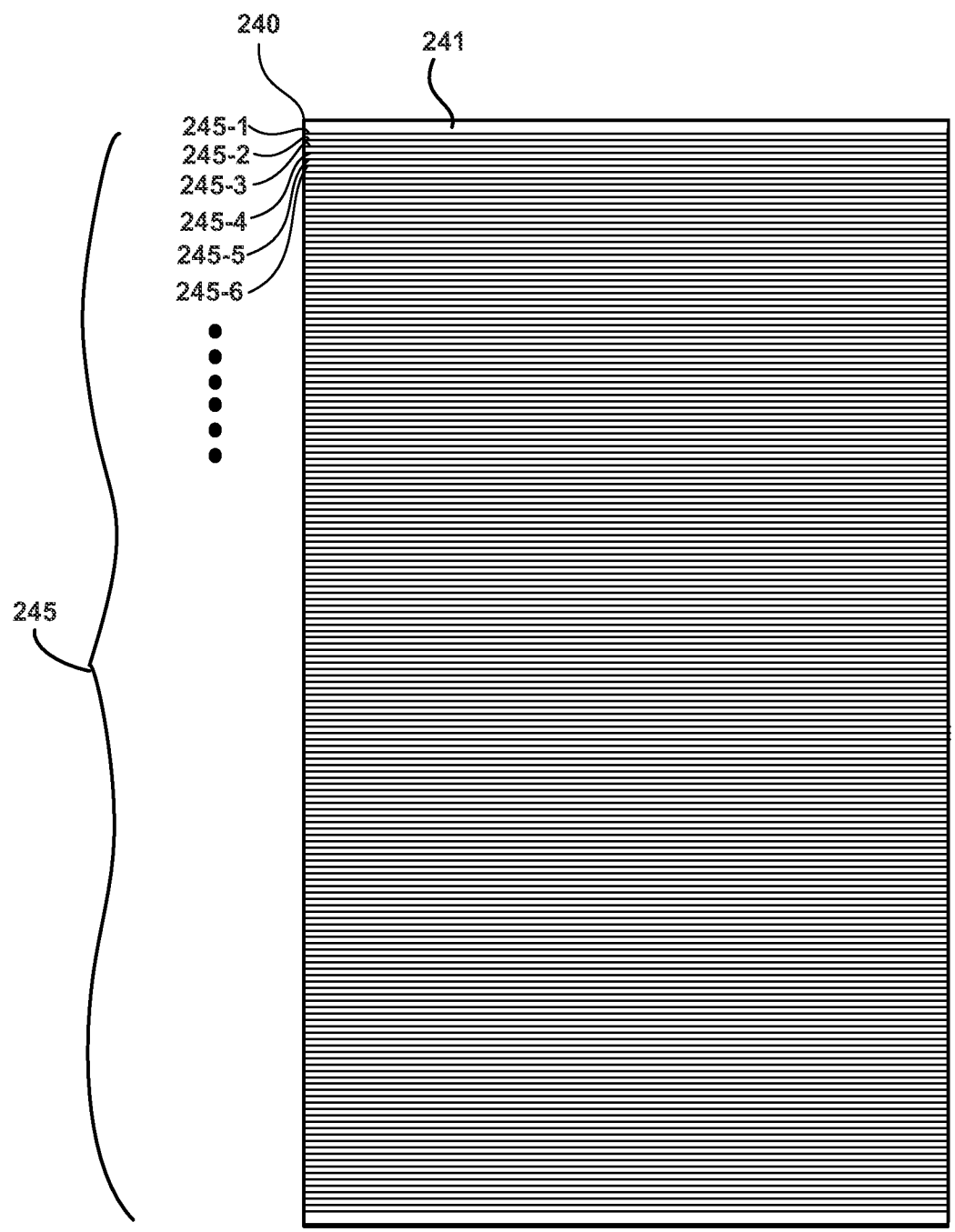
FIG. 2B is a plan view of substrate that includes a segmented Vcom electrode, where the Vcom electrode has been segmented into a plurality of common voltage electrode segments, according to an embodiment.

FIG. 2B is a plan view of substrate 240 that illustrates another embodiment of a segmented Vcom electrode 245, where the Vcom electrode has been segmented into a plurality of common voltage electrode segments (e.g. 245-1, 245-n). In one embodiment, the common voltage electrode segments are the pixel electrodes 750 (e.g., 750-1, 750-2, 750-3 . . . ), that are also referred to as micro-rows, shown in FIG. 7. In such an embodiment, each common voltage electrode segment can be driven independently for capacitive sensing or display refreshing. In one specific example, where the display device comprises 800 pixel rows, the common voltage electrode is segmented into 800 common voltage electrode segments.

Figure 2C:
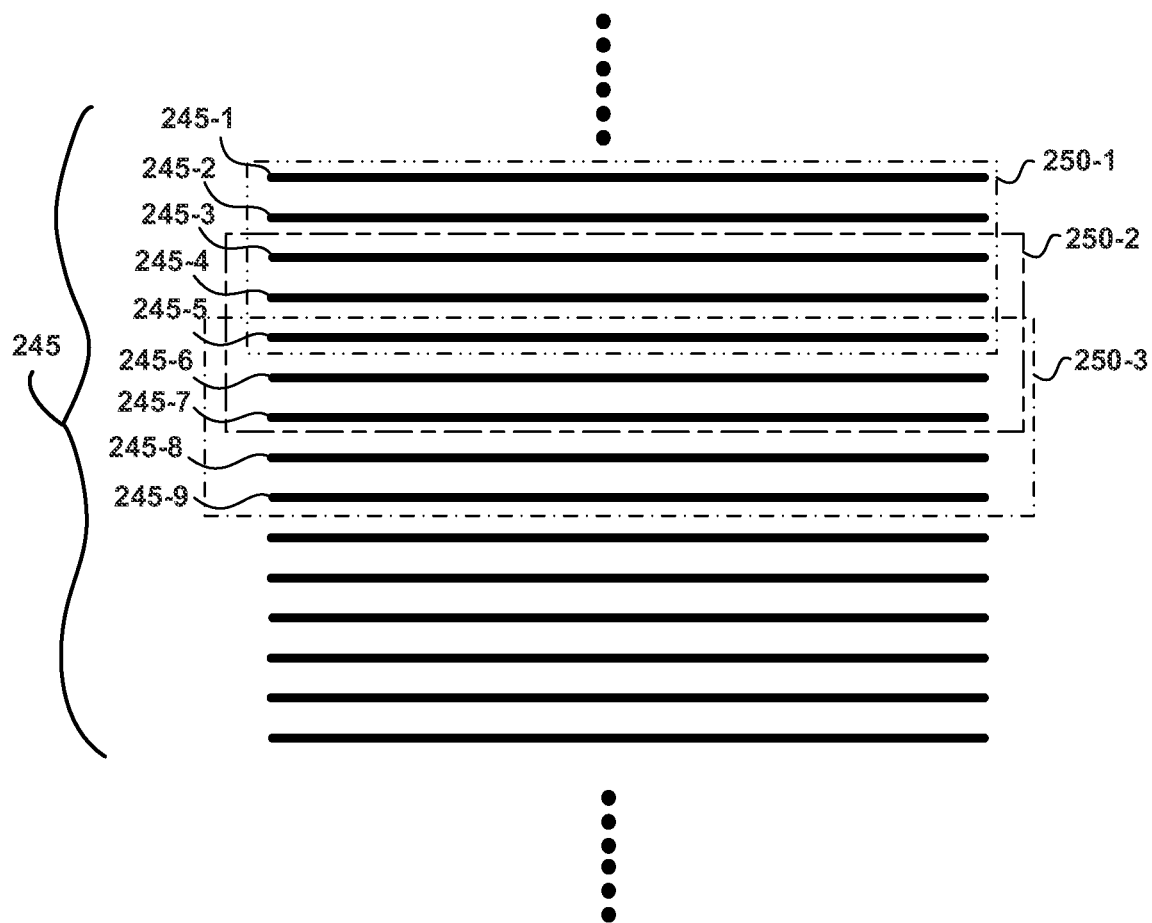
FIG. 2C is a partial plan view of a segmented Vcom electrode, showing how common voltage electrode segments can be grouped into macro-rows where each macro-row combines more than one common voltage electrode segment, according to an embodiment.

FIG. 2C is a partial plan view of a further embodiment of a segmented Vcom electrode 245. In the embodiment illustrated in FIG. 2C, the common voltage electrode segments are grouped into macro-rows, where each macro-row combines more than one common voltage electrode segment. This can provide an increase in the capacitive coupling between transmitter sensor electrodes and receiver sensor electrodes. Further, in some embodiments, macro-rows are created by driving more than one common voltage electrode segment with the same signal. In the embodiment shown in FIG. 2C, common voltage electrode segments 245-1 through 245-5 form macro-row 250-1, common voltage electrode segments 245-3 through 245-7 form macro-row 250-2 and common voltage electrode segments 245-5 through common voltage electrode segments 245-9 form macro-row 250-3. As can be seen from such an embodiment, common voltage electrode segments may be shared between macro-rows. In another embodiment, the common voltage electrode segments are not shared between macro-rows. In further embodiments, the macro-rows may include different number of common voltage electrode segments. In other embodiments, it would be possible to drive at least one common voltage electrode segment of a macro-row (e.g. 250-1) for display updating while at least one other common voltage electrode of the macro-row (250-1) is driven for touch sensing.

With any of the above arrangements, utilizing a segmented Vcom electrode 245, it is no longer necessary, as it was with an unsegmented Vcom electrode, to transition the voltage on the entire unsegmented Vcom electrode, but only on the segment, such as common voltage electrode segment 245-1, that is directly above the row of pixels to be refreshed. It is appreciated that, in one embodiment, this arrangement reduces the power required to transition the voltage on the individual common voltage electrode segments, in comparison to the power required to transition the voltage on a conventional unsegmented Vcom electrode. This power reduction occurs because each segment (e.g., 245-1) of segmented Vcom electrode 245 has only a fraction of the capacitance of an entire unsegmented Vcom electrode. Thus, transitioning a voltage on one segment of segmented Vcom electrode 245 or some subset (less that all) of the segments of segmented Vcom electrode 245 requires less power than transitioning a voltage on an entire unsegmented Vcom electrode.

Figure 3:
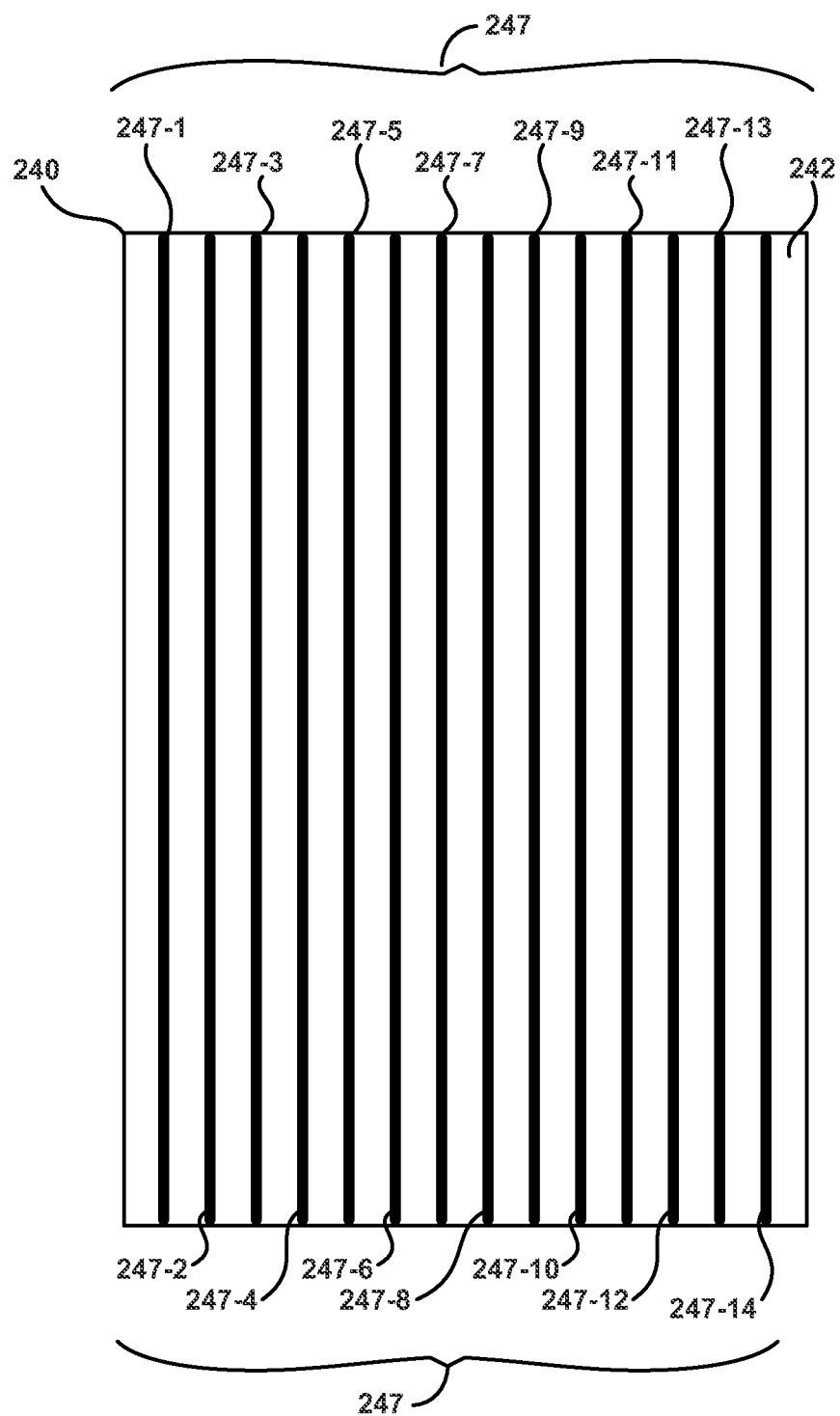
FIG. 3 is a plan view of an example substrate that includes an overlay of capacitive sensor electrodes, according to an embodiment.

Example Capacitive Touch Sensor Implemented in Conjunction with a Segmented Common Voltage Electrode FIG. 3 is a plan view of an example substrate 240 that includes an overlay of capacitive "receiver sensor electrodes" 247, according to an embodiment.

Figure 4:
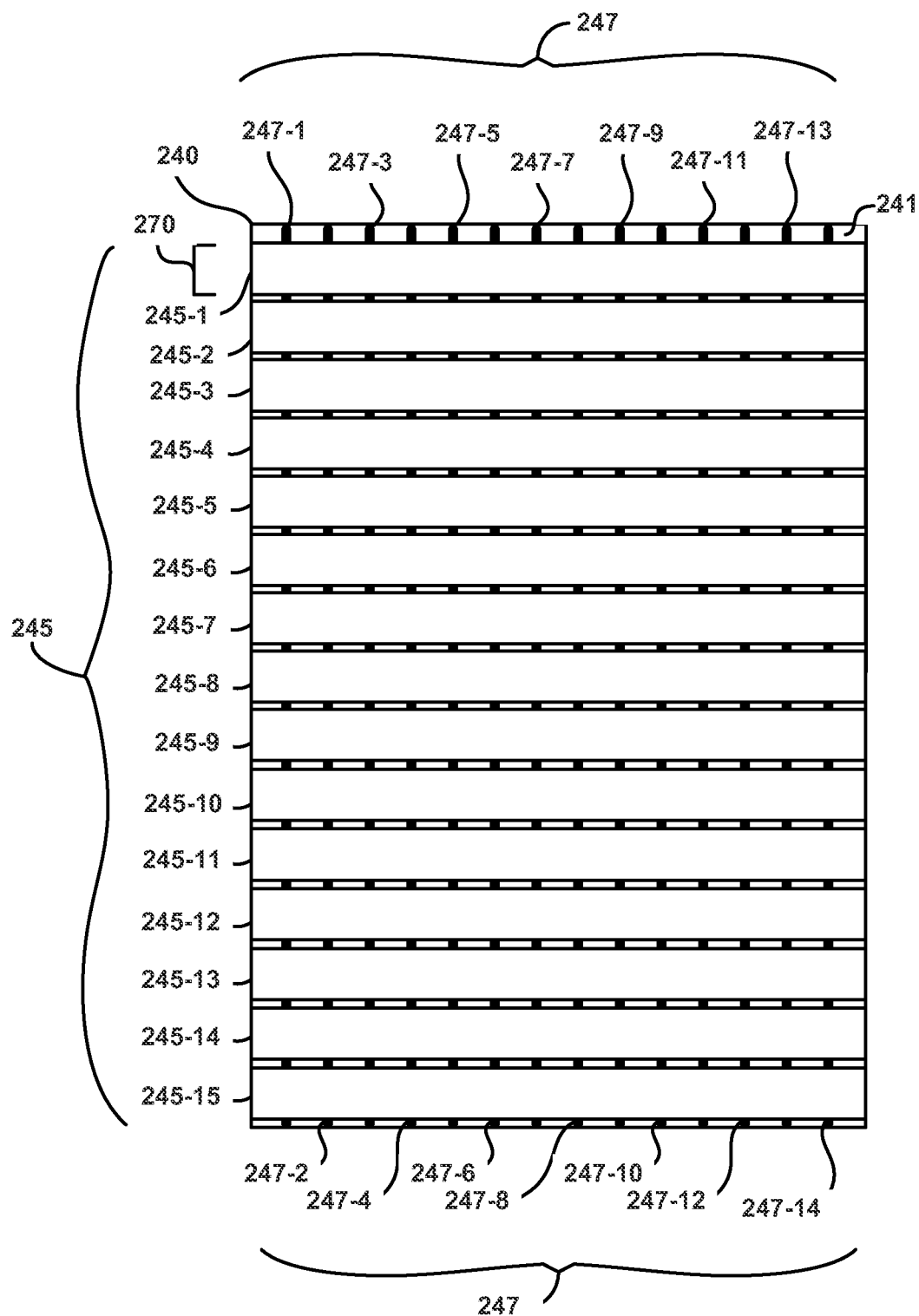
FIG. 4 is a plan view of an example substrate that includes an overlay of capacitive sensor electrodes and a segmented Vcom electrode, according to an embodiment.

FIG. 4 is a plan view of an example substrate 240 that includes an overlay of receiver sensor electrodes 247 and a segmented Vcom electrode 245, according to an embodiment. As is illustrated, in one embodiment, the receiver sensor electrodes 247 are disposed such that they are substantially orthogonally oriented with respect to the segments of segmented Vcom electrode 245. With respect to a display, such as LCD 100 of FIG. 1, the receiver sensor electrodes 247 and segmented Vcom electrode 245 may be disposed on a single substrate (either on the same or opposing surfaces) or on different substrates. With respect to LCD 100, the substrates include polarizer 110-2, color filter panel 140, and in some embodiments a cover layer (not illustrated) that is not required for the function of the display portion of an integrated display and touch sensor device (such as device 1200 of FIG. 12). Other types or implementations of displays, other than LCD 100, may include different, fewer, or additional substrates.

With reference to FIGS. 3 and 4, in one embodiment, either side (241, 242) of substrate 240 can be overlaid with vertically-oriented receiver sensor electrodes 247 (shown as receiver sensor electrodes 247-1 to 247-14 in the illustrated examples).

As shown in FIG. 4, in one embodiment, receiver sensor electrodes 247 are patterned on surface 241 of substrate 240 before the segmented Vcom electrode 245 is deposited. With reference to FIG. 1, in one embodiment where substrate 240 is a color-filter panel such as color-filter panel 140, this comprises patterning receiver sensor electrodes 247 on lower surface 141 of color filter panel 140 before the segmented Vcom electrode 245 is deposited. In such an embodiment, if the common voltage electrode segments and the receiving electrodes need to cross each other, jumpers can be used at the intersections between the common voltage electrode segments and receiving electrodes as appropriate, to prevent the transmitting and receiving electrodes from ohmically contacting each other. Alternatively, an insulating layer can be disposed between the common voltage electrode segments and the receiving electrodes.

As shown in FIG. 3, in one embodiment, receiver sensor electrodes 247 are patterned on surface 242 of substrate 240 and segmented Vcom electrode 245 is deposited on surface 241. With reference to FIG. 1, in one embodiment where substrate 240 is a color-filter panel such as color-filter panel 140, this comprises receiver sensor electrodes 247 being patterned on the upper surface 142 of color filter panel 140 while the segmented Vcom electrode is patterned on the lower surface 141.

With continued reference to FIG. 1, in other embodiments, receiver sensor electrodes 247 can be patterned on one or more of the top and bottom surfaces of top polarizer 110-2.

In another embodiment, receiver sensor electrodes 247 are patterned on a separate glass, polyethylene terephtalate (PET), or similar substrate that is then laminated, adhered, or otherwise affixed to the outer top surface of an LCD module (e.g., as a cover layer). Although such an embodiment would require an extra substrate (as is used conventionally to combine capacitive sensors with displays such as LCD 100), the finished display would still utilize a segmented Vcom electrode and thus include some assembly efficiencies and reductions in optical impairment versus using an unsegmented Vcom electrode and separate sensor drive electrodes.

The segments of segmented Vcom electrode 245 now also serve as the row drive electrodes for capacitive sensing, eliminating one layer of transparent conductors compared to a conventional capacitive touch screen, reducing the cost, potentially reducing the module thickness, and improving the optical properties.

Furthermore, the Vcom electrode in a display, such as LCD 100, is typically driven with a wide voltage swing which may be on the order of 10 volts, using special high-voltage drive circuits on a display driver chip. This high voltage drive will give the capacitive touch sensor a much higher signal-to-noise ratio than would be available using a typical 3.3V touch sensor chip. This will improve the signal-to-noise ratio of the capacitive sensor.

Moreover, as the common voltage electrode segments double as drive electrodes for the capacitive sensor, the capacitive sensor drive electrodes will always be in good alignment with the pixel array, since the color filter panel itself is already required to be in good alignment. In one embodiment, this alignment ensures that the patterned breaks between common voltage electrode segments will fall between rows of pixels where they do not impact the optical properties of the display. Given such inherent alignment, optical index matching may not be required to make the segmented Vcom electrode patterning practically invisible. Thus, in one embodiment, each display pixel will fully reside beneath a single common voltage electrode segment, eliminating any display non-uniformity that might be caused by the patterning.

Feature Requirements

Figure 5:
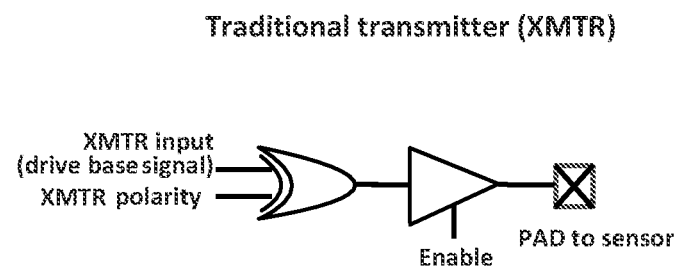
FIG. 5 is a block diagram of the features traditionally required of the transmitter pad that a transmitter electrode of a display would be coupled with, according to an embodiment.

FIG. 5 is a block diagram of the features traditionally required of the transmitter pad that a transmitter electrode of a display would be coupled with, according to an embodiment. FIG. 5 illustrates an exclusive OR gate with two inputs, XMTR input (which is the signal that drives the gates of display transistors) and XMTR Polarity (which controls the polarity of the drive signal). The output of the exclusive or gate is coupled with a tri-state buffer that can be enabled to allow the signal to be driven. The required states for the traditional transmitter pad include: 1) low (ground); 2) high (some positive voltage); and 3) floating (tri-state).

Figure 6:
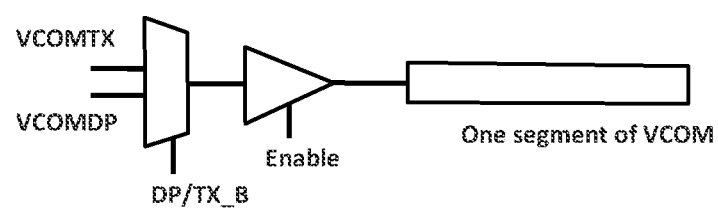
FIG. 6 is a block diagram of the features required for a transmitter for a segment of a segmented Vcom electrode, according to an embodiment.

FIG. 6 is a block diagram of the features required for a transmitter for a segment of a segmented Vcom electrode, according to an embodiment. FIG. 6 illustrates a two-input multiplexor with a select line. The inputs to the multiplexor include a VCOMTX signal (which is a traditional input to a transmitter sensor electrode) and VCOMDP (which is a traditional input to a display driver electrode). The select line uses a DP/TX_B signal that selects between the VCOMTX and VCOMDP signal. The output of the multiplexer is coupled to the input of a tri-state buffer that can be enabled to allow the selected signal to be driven onto a Vcom electrode segment. The required states for each segment of a segmented Vcom include: 1) low (which may be ground); 2) high (which is some higher voltage than low); 3) floating (tri-state); 4) high Vcom; and 5) low Vcom. It is appreciated that the high and low Vcom may be the same at some points in time in some embodiments where a DCVCOM is used for a display drive signal.

Circuit Diagrams

Figure 7:
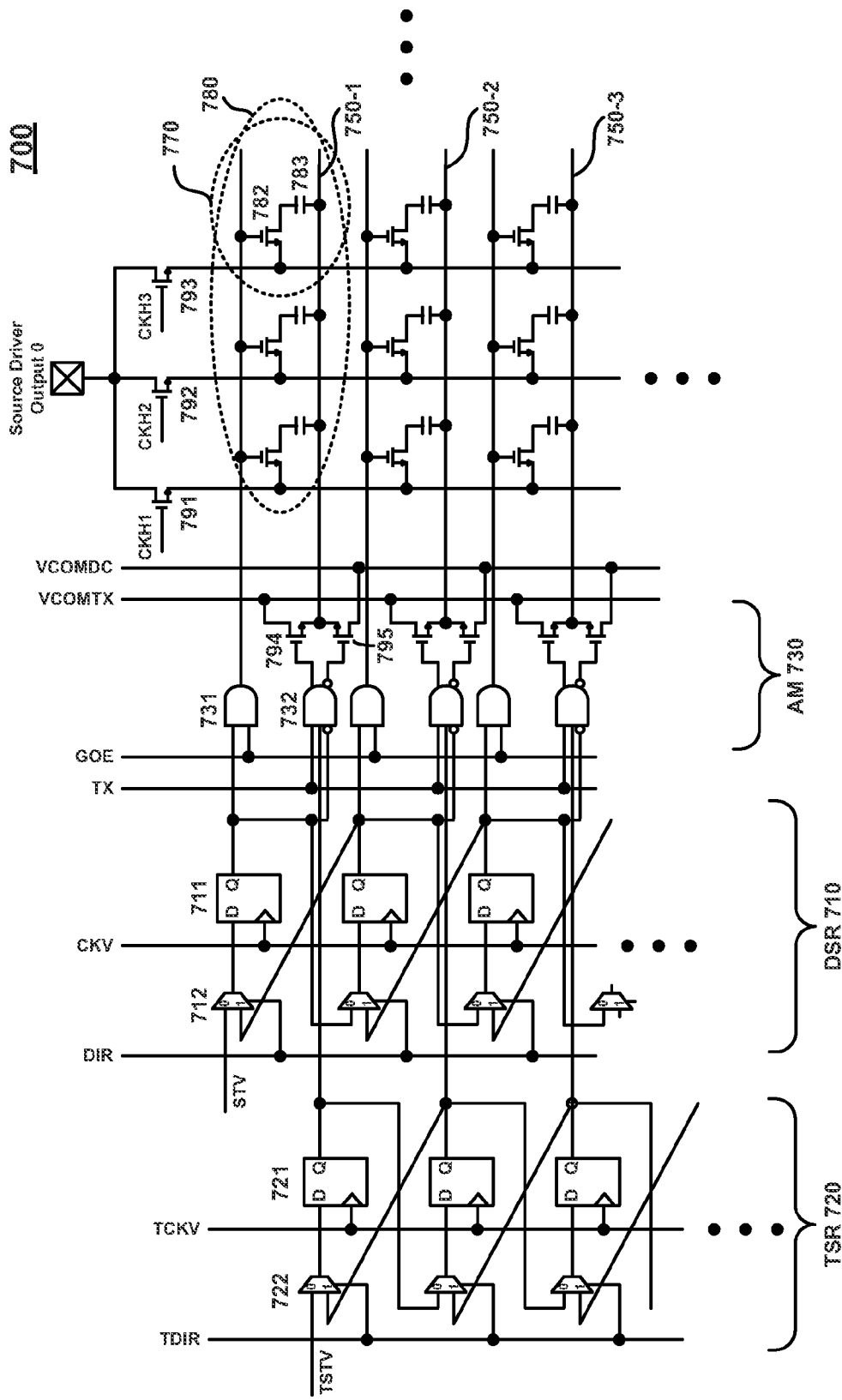
FIG. 7 is a circuit diagram of a combined display drive mechanism, sensor drive mechanism, and arbitration mechanism of a display device having an integrated capacitive proximity sensor, according to an embodiment.

FIG. 7 is a circuit diagram of a combined display drive mechanism 710, sensor drive mechanism 720, and arbitration mechanism 730 of an display device having an integrated capacitive proximity sensor 700 (also referred to herein as device 700), according to an embodiment. FIG. 7 shows an implementation where a sensor drive mechanism (transmitter shift register 720) is added to a display shift register that normally drives the gates of the pixel transistors in a Liquid Crystal Display such as an amorphous silicon Active Matrix LCD (AMLCD) or a Low Temperature Poly-Silicon (LPTS) LCD. It is appreciated, that in some embodiments, that the circuitry depicted in FIG. 7 may be disposed upon on at least one glass substrate of an LCD (e.g., on a surface of color filter panel 140 of FIG. 1). In other embodiments, portions of the circuitry depicted in FIG. 7 may be included within one or more integrated circuits (IC). In further embodiments, all of the circuitry depicted in FIG. 7 may be included within one or more integrated circuits (IC).

In FIG. 7, numerous inputs are illustrated. These inputs include: Source Driver Output 0, DIR, GOE, CKV, STV, CKH1, CKH2, CKH3, VCOMDC, VCOMTX, TX, TCKV, TDIR, and TSTV, some or all of which may be generated by and received from one or more integrated circuits and/or from a processing system, such as processing system 1210 of FIG. 12.

Source Driver Output 0, is one of a plurality of Drive Source Driver Output signals. Each source driver output is respectively clocked onto the source of a pixel transistor of a selected sub-pixel 770 in a selected pixel 780.

DIR shifts direction of DSR 710.

GOE is the global output enable to the selected row for display purposes. It enables the gates of the pixel transistors of one display line, specifically the one selected by DSR 710. The display rows that are associated with pixel electrodes 750 (750-1, 750-2, 750-3 . . . ) are also known as micro-rows.

CKV is the clock signal to shift the DSR 710 and is the clock for vertical display refresh.

STV is the digital start token input to DSR 710. DIR controls the shift direction of DSR 710.

CKH1, CHK2, and CKH3 are individual clocks for red, green and blue pixels. When a line is selected a pulse on one of these signals charges the selected sub-pixel capacitor (e.g., 783) to the voltage of the source driver output. These signals are not relevant for description of this circuit, but are typically present in a display.

VCOMDC is a DC signal that represents VCOM in a case that of system that uses a DC-VCOM display driver. Although depicted, it is appreciated that embodiments of the present invention are not limited to displays that use such a display driver.

Figure 11:
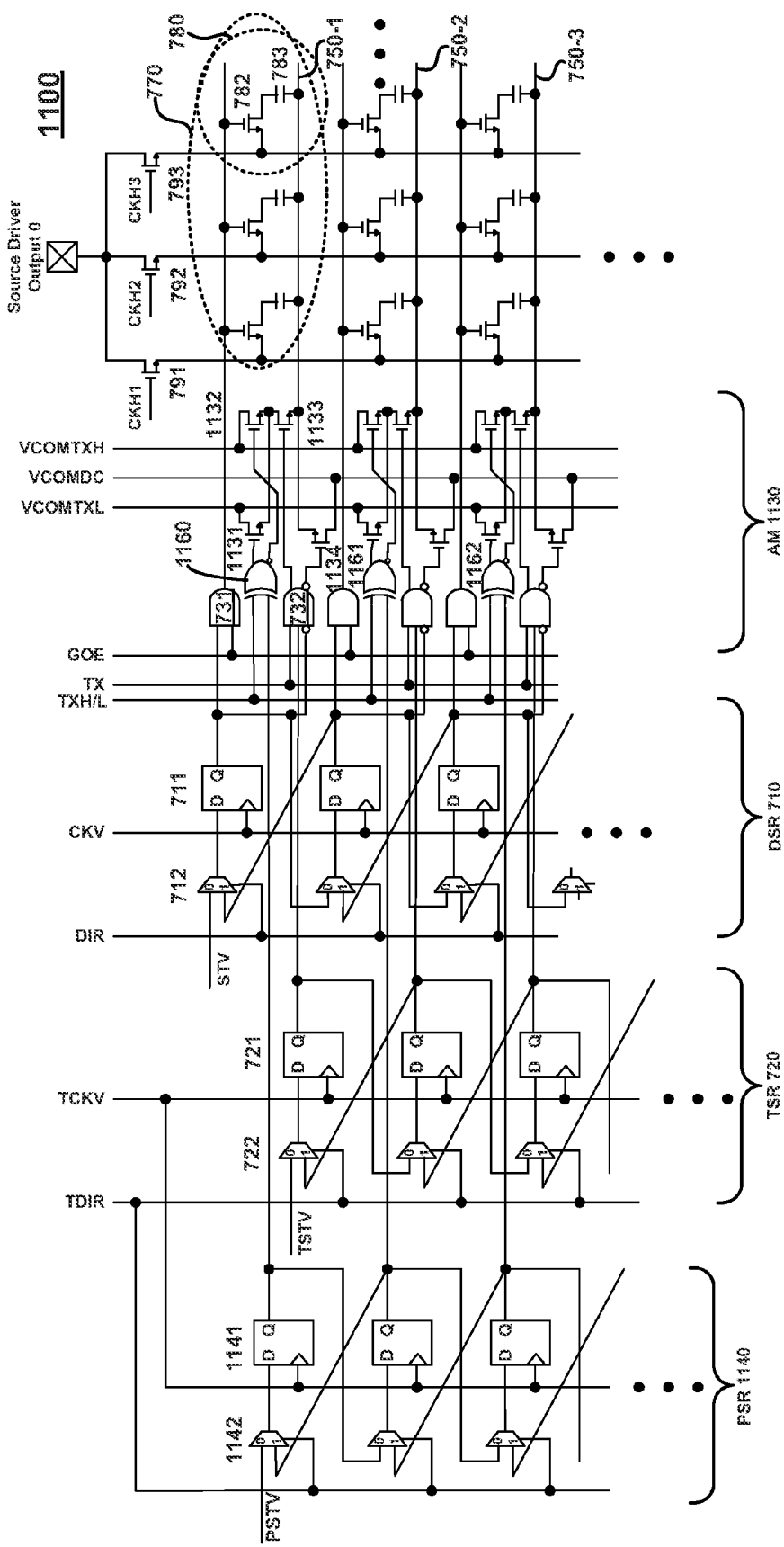
FIG. 11 illustrates the circuit diagram of FIG. 7 with an included polarity control device, according to an embodiment.

VCOMTX is the traditional input signal to all sensor transmitters. In a proximity sensor application this signal is available as is or inverted based on a per-transmitter polarity setting. FIG. 7 does not show the support of polarity, however, an example of polarity support is illustrated in FIG. 11.

TX (TXEN) enables VCOMTX into the VCOM conductor for the selected transmit rows of the micro-rows 750. In one embodiment, a group of transmit rows (e.g., 750-1 and 750-2) is typically simultaneously selected to create enough capacitive coupling between transmitter sensor electrodes (common voltage electrode segments) and receiver sensor electrodes (Ct) and change in the capacitive coupling (delta Ct) suitable for touch sensing. A group of transmit rows that are simultaneously selected are known as macro-rows. In one embodiment, TX=0 can be used to create the tri-state condition required by traditional transmitters. It can also be used to create stretch states. In FIG. 7, when a row is not selected for touch purposes it is automatically connected to DCVCOM, however embodiments are not restricted to this behavior. Other embodiments create transmitter stretch states to float VCOMTX. For example, in one embodiment, a floated VCOMTX can be used to create a guard band which neither refreshes a display row nor transmits a sensor signal.

TCKV is the clock for the touch shift register (TSR 720). TCKV causes a shift on the selected touch rows. It is appreciated that one sensing cycle may include one or more clocks to the TSR.

TDIR controls the shift direction of TSR 720.

TSTV is a digital input to TSR 710. The amount of TCKV clock cycle for which this input is high, defines that width of the touch region (the number of micro rows that are included in a macro-row that transmits VCOMTX for touch sensing).

With continued reference to FIG. 7, a display includes a plurality of display pixels 770 which include red, blue and green sub-pixels. Sub-pixel 780 is an example of such a sub-pixel and it includes a sub-pixel transistor 782 and sub-pixel capacitor 783 that couple it to a pixel electrode 750 (in this case 750-1). The gate of sub-pixel transistor 782 is coupled with the output of display drive gate 731 (as are all other sub-pixel transistors in this row). Sub-pixel transistors in other rows are coupled to their respective row's display gate driver. The drain of sub-pixel transistor 782 is coupled through sub-pixel capacitor 783 to pixel electrode 750-1. Other sub-pixel transistors in the same row are similarly coupled to pixel electrode 750-1, and sub-pixel transistors on other rows are similarly coupled to their respective row's pixel electrode 750. The source of sub-pixel transistor 782 is couple to Source Driver Output 0 when a clock signal, CKH3, is applied to the gate of transistor 793. Other sub-pixel transistors in the same column (which are like colored sub-pixels to one another) are similarly coupled to Source Driver Output 0. Sources of other sub-pixels in pixel 770 are coupled in a similar manner via application of Clock signal CKH2 to the gate of transistor 792 and the application of CHK1 to transistor 791. Other pixels and sub-pixels in device 700 are similarly coupled to their respective source driver outputs. As illustrated in FIGS. 7-11, in this manner, a plurality of pixels 770 are coupled to pixel electrodes 750 in rows.

It is appreciated that a pixel electrode of pixel electrodes 750 may be selected and utilized for transmitting VCOMDC during display refresh. It is further understood that one or more pixel electrodes of pixel electrodes 750 can also be selected and utilized for transmitting VCOMTX during capacitive sensing, in this manner these sensor electrodes serve both sensor functions and display functions in device 700. It is appreciated that, in some embodiments, groups of one or more of the pixel electrodes 750 (but less than all) are synonymous with segmented Vcom electrodes as illustrated in FIG. 2.

DSR 710 controls which pixel electrode of pixel electrodes 750 is activated to transmit VCOMDC for display refresh. DSR 710 includes a plurality of 2-1 multiplexors (such as multiplexor 712) and a plurality of memory elements (such as flip flop 711) that are arranged as a shift register. The row outputs of DSR 710 (e.g., Q from flip flop 711) are coupled as inputs to an arbitration mechanism (e.g., one input of display drive gate 731 and one input of arbitration gate 732) for a pixel row associated with each respective row output. The other input to display drive gate 731 for a particular pixel row is GOE. While the other inputs for arbitration gate 732 are an output (Q) from touch shift register 720 and TX.

TSR 720 controls which pixel electrode(s) of pixel electrodes 750 is/are active for transmitting VCOMTX for touch sensing. TSR 720 includes a plurality of 2-1 multiplexors (such as multiplexor 722) and a plurality of memory elements (such as flip flop 721) that are arranged as a shift register. The row outputs of TSR 720 (e.g., Q from flip flop 721) are coupled as inputs to an arbitration mechanism (e.g., one input to arbitration gate 732) for a pixel row associated with each respective row output. As depicted, TSR 720 clocks in information in a serial fashion, however, it is appreciated that a memory bus may alternatively be utilized to provide touch sensor electrode excitation information in parallel from a memory or other source. Each signal line of such a memory bus would be equivalent to a Q output from a flip flop of TSR 720. Similarly a state machine from RAM can also be utilized, in one embodiment, to generate/provide touch sensor electrode. It is appreciated that the state machine may include or be embodied in a memory element such as random access memory or a read only memory. In one embodiment TSR 720 may be smaller than DSR 710. In such an embodiment, each row output of TSR 720 is coupled to more than one pixel electrode 750. In one specific example, TSR 720 comprises twenty shift registers, each with a row output. For a display having 800 pixel rows, each row output of TSR 720 is coupled with multiple pixel rows (e.g., 40 pixel rows). Further, DSR 710 may be coupled with each of the 800 pixels rows; therefore, TSR 720 will be smaller than DSR 710.

Arbitration mechanism 730 includes a plurality of display drive gates (such as display drive gate 731), a plurality of arbitration gates (such as arbitration gate 731), and a plurality of transistors that are selected to control which signal is driven on a pixel electrode (e.g., transistors 794 and 795 are associated with and selected by the inverted and non-inverted outputs from arbitration gate 732).

Figure 8:
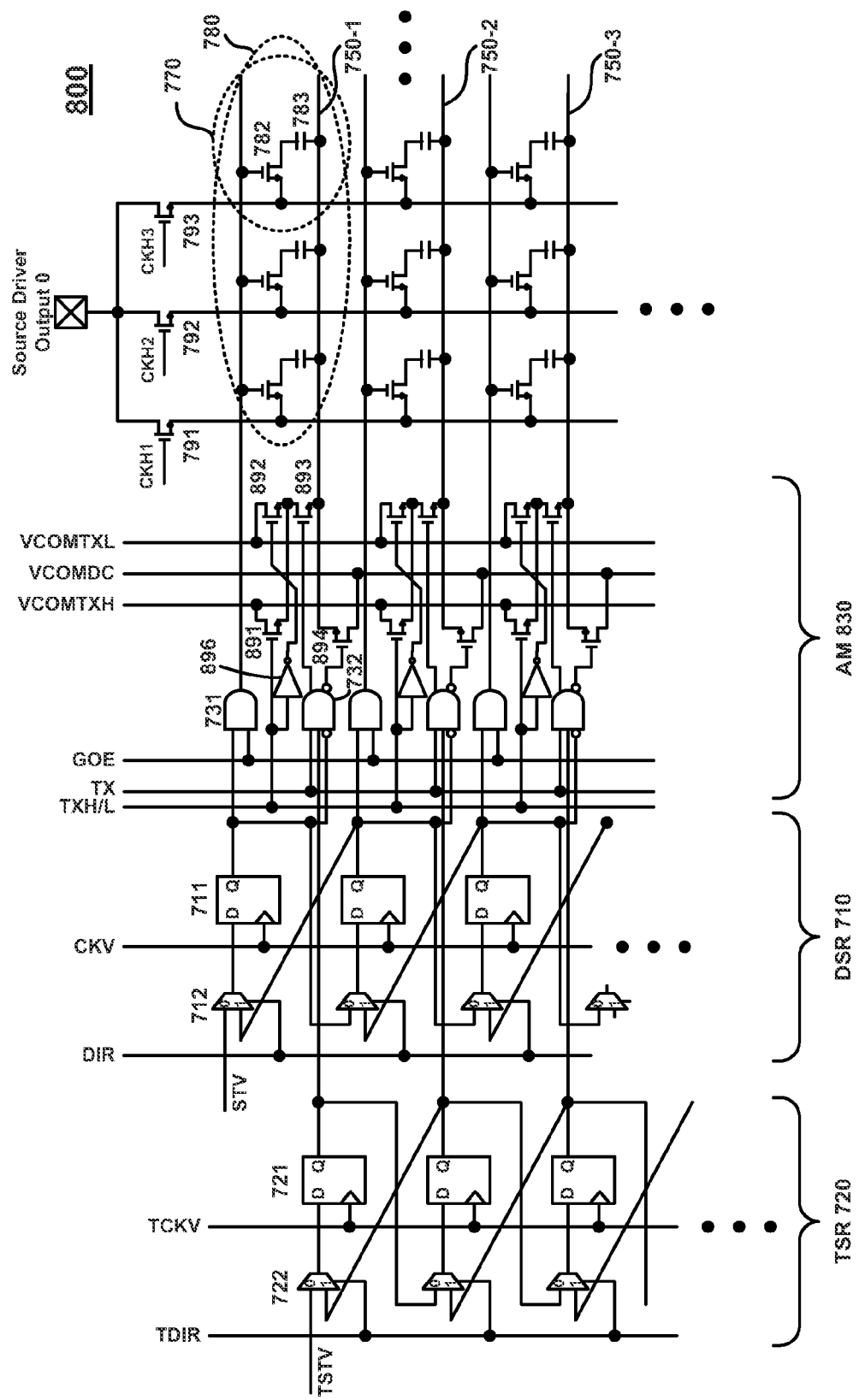
FIG. 8 is a circuit diagram showing an arbitration mechanism, according to an embodiment.

In one embodiment, arbitration in FIG. 7 is accomplished by inhibiting access to touch scan use while the same common voltage electrode segment is used for display refresh purposes. Synchronization between the touch and display scanning is also a method for arbitration (by avoiding a need for it). However, in some systems, synchronization is not a preferred arbitration method as it reduces the ability of the touch system to avoid unwanted external interference by changing touch sensing frequency to a lower frequency than might be desired. Arbitration gate 732 always give priority to a display drive signal over a touch drive signal if ever both are selected on the same pixel electrode at the same time. This prevents both of the electrical signals (VCOMTX and VCOMDC) from simultaneously being driven on a pixel electrode. Other mechanisms of arbitration are possible. For example, a processing system, such as processing system 1210 may conduct the arbitration or supply pre-arbitrated touch and display select signals. Other logic arrangements may also be utilized for arbitration. FIG. 8 shows another such arrangement of arbitration logic.

FIG. 8 is a circuit diagram showing an arbitration mechanism according to another embodiment: FIG. 8 is a circuit diagram of a combined display drive mechanism, sensor drive mechanism, and arbitration mechanism of an display device having an integrated capacitive proximity sensor 800 (also referred to herein as device 800), according to an embodiment. Device 800 differs from device 700 in that, rather than switching VCOMTX from a high state to a low state, a high signal (VCOMTXH) and a low signal (VCOMTXL) are provided and may be selected between when driving a VCOMTX signal on a pixel electrode. TXH/L is a signal used to select either VCOMTXH or VCOMTXL to be driven on one or more pixel electrodes 750. It is appreciated that TXH/L, VCOMTXH, and VCOMTXL are signals that are generated and received from one or more integrated circuits (not shown) and/or a processing system (such as processing system 1210).

Arbitration mechanism 830 includes a plurality of display drive gates (such as display drive gate 731), a plurality of arbitration gates (such as arbitration gate 732), a plurality of invertors (such as inverter 896) and a plurality of transistors that are selected to control which signal is driven on a pixel electrode (e.g., transistors 891, 892, 893, and 894) that are associated with and selected by the inverted and non-inverted outputs from arbitration gate 732, TXH/L select line, and/or invertors 896). TXH/L is coupled with the gate of transistor 891 (and similar transistors for other pixel electrodes 750) and the input to inverter 896 (and to similar inverters for other pixel electrodes 750). As in FIG. 7, arbitration gate 732 always gives priority to a display drive signal over a touch drive signal if ever both are selected on the same pixel electrode at the same time. This prevents two electrical signals (VCOMDC and VCOMTXH or VCOMTXL) from simultaneously being driven on a pixel electrode. Other mechanisms of arbitration are possible. TXH/L allows selection between driving VCOMTXH or VCOMTXL on a pixel electrode (e.g., pixel electrode 750-1) when VCOMDC is not being driven on the same pixel electrode.

Figure 9:
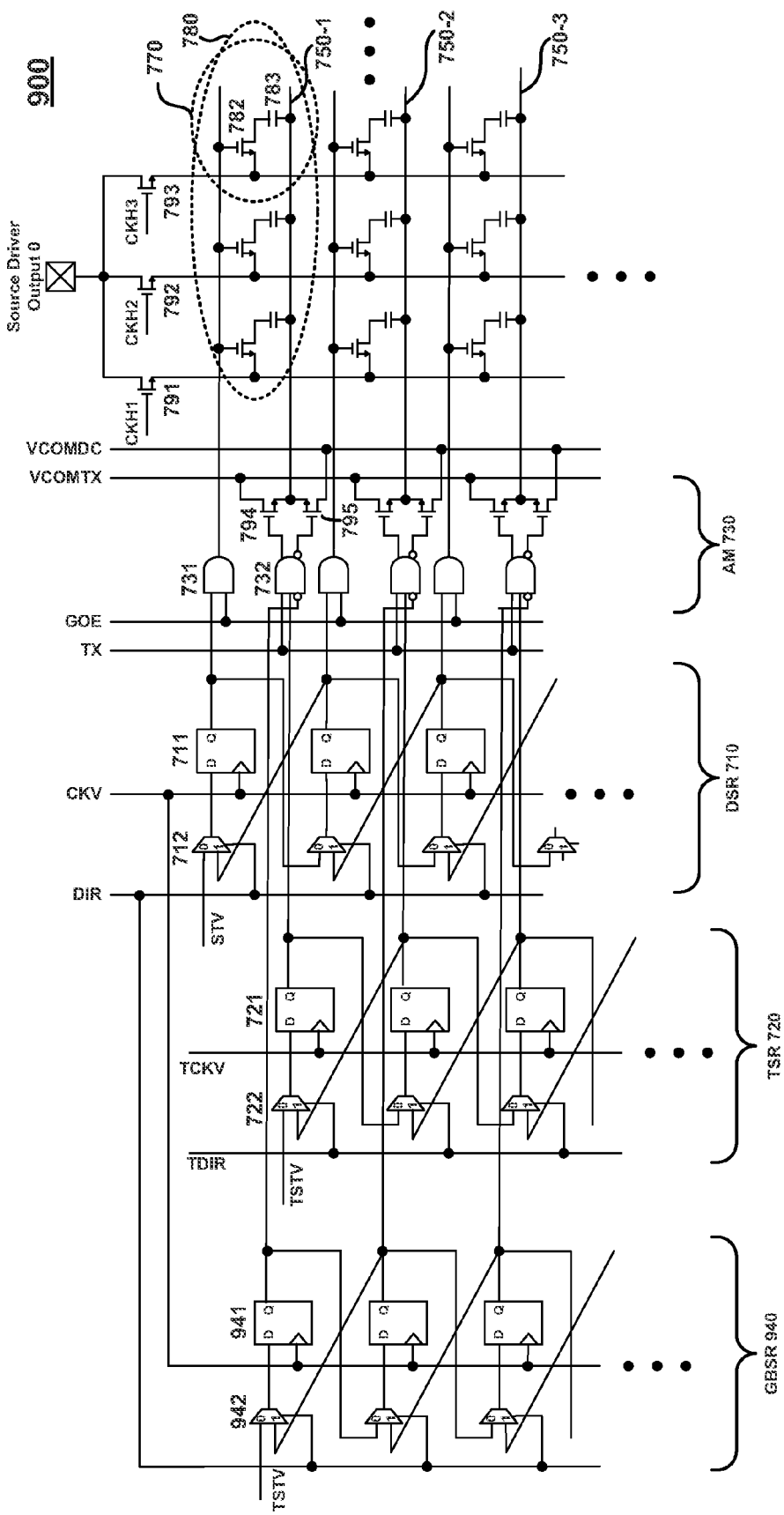
FIG. 9 illustrates the circuit diagram of FIG. 7 with an included guard band control device, according to an embodiment.

FIG. 9 illustrates the circuit diagram of FIG. 7 with an included guard band control device, according to an embodiment. FIG. 9 is a circuit diagram of a combined display drive mechanism, sensor drive mechanism, guard band mechanism, and arbitration mechanism of an display device having an integrated capacitive proximity sensor 900 (also referred to herein as device 900), according to an embodiment.

Arbitration (synchronous or asynchronous) may require a guard-band that guarantees that when a given pixel electrode 750 is selected for display purposes by display drive mechanism, one or more pixel electrodes 750 before and after it become prohibited for touch access. Such a guard band can assist in avoiding cross-coupling issues between touch and display. In a synchronous system this is trivial but for other cases, one possible implementation is to add a guarding mechanism (for example, another set of shift registers in the form of guard band shift register (GBSR) 940) that is controlled by the display vertical shift clock (CKV). The guarding mechanism identifies a band of pixel electrodes that are inhibited from touch access. Again, with respect to arbitration, the display scanning access to each segment of VCOM (e.g., a pixel electrode such as pixel electrode 750-1) has higher priority than touch access. Alternatively, in cases where guard banding can be a fixed amount of rows, it is possible to implement it in a smaller area of circuitry real estate than illustrated in FIG. 9.

GBSR 940 controls which pixel electrode(s) of pixel electrodes 750 is/are inhibited, or guarded from transmitting VCOMTX for touch sensing. GBSR 940 includes a plurality of 2-1 multiplexors (such as multiplexor 942) and a plurality of memory elements (such as flip flop 941) that are arranged as a shift register. The row outputs of GBSR 940 (e.g., Q from flip flop 941) are coupled as inputs to an arbitration mechanism (e.g., one input to arbitration gate 732) for a pixel row associated with each respective row output. As can be seen, a difference from device 700 is that the outputs (Q) from GBSR 940 replace the output from DSR 710 as an arbitration inputs on arbitration gates of arbitration mechanism 730. This allows for guarding a block of several pixel electrodes 750 from being driven with a VCOMTX signal when display refresh has been selected for one of the pixel electrodes in the block.

Figure 10:
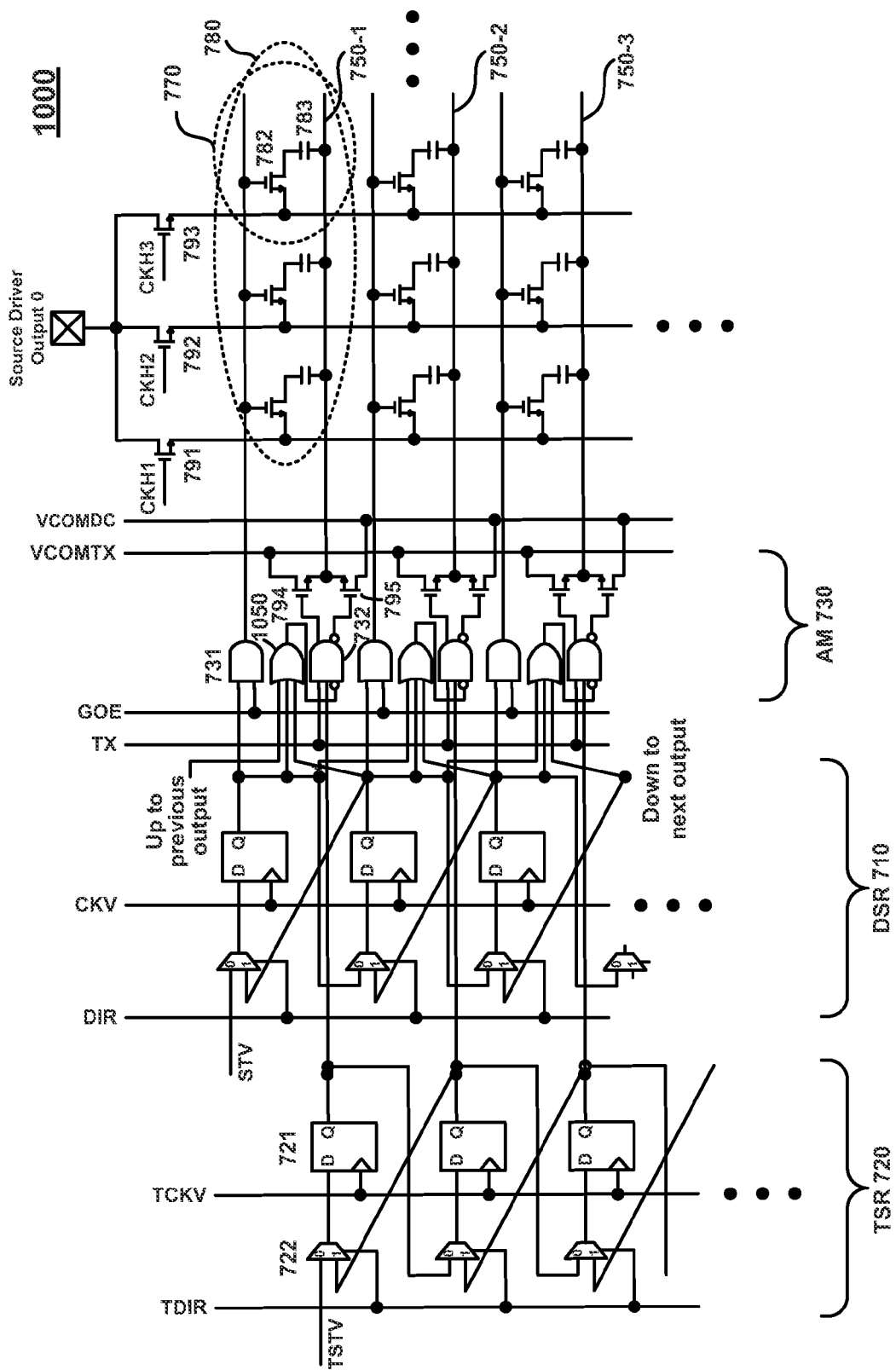
FIG. 10 illustrates the circuit diagram of FIG. 7 with an included guard band control device, according to an embodiment.

It is appreciated that such guarding can be accomplished in a number of ways. For example, a processing system (e.g., processing system 1210) can accomplish the guarding. Such guarding can be accomplished in other manners in circuitry. For example, in one embodiment, guarding can be accomplished by adding two extra inputs to the arbitration gates of arbitration mechanism 730. One of the two new inputs is connected to the previous row's flip flop output of DSR 710 and the other is connected to the next row's flip flop output of DSR 710. FIG. 10 illustrates yet another manner in which guarding can be accomplished.

FIG. 10 illustrates the circuit diagram of FIG. 7 with an included guard band control device, according to an embodiment. FIG. 10 is a circuit diagram of a combined display drive mechanism, sensor drive mechanism, guard band mechanism, and arbitration mechanism of an display device having an integrated capacitive proximity sensor 1000 (also referred to herein as device 1000), according to an embodiment. FIG. 10 illustrates implementing a guard band mechanism using OR logic to "edge detect" the display scanning. As can be seen, a difference from device 700 is that the output from an OR gate (such as OR gate 1050) replaces the output from DSR 710 as an arbitration inputs on arbitration gates of arbitration mechanism 730. This allows for guarding a block of pixel electrodes 750 from being driven with a VCOMTX signal when a display drive signal has been selected for driving one of the pixel electrodes 750 in the block. The guarding is accomplished by using an OR gate, such as OR gate 1050, to see if adjacent rows (pixel electrodes) are being selected by DSR 710 for display drive excitation information.

FIG. 11 illustrates the circuit diagram of FIG. 7 with an included polarity control device, according to an embodiment. FIG. 11 is a circuit diagram of a combined display drive mechanism 710, sensor drive mechanism 720, polarity control device (PSR 1140 and XOR gates 1160, 1161, and 1162) and arbitration mechanism 1130 of an display device having an integrated capacitive proximity sensor 1100 (also referred to herein as device 1100), according to an embodiment. As depicted in FIG. 11, polarity control device may comprise a polarity shift register (PSR 1140).

Arbitration mechanism 1130 includes display drive gate 731, arbitration gate 732, and transistors 1131, 1132, 1133, and 1134. GOE provides one input to a pixel electrode display gate, such as display drive gate 731, while the output of a flip flop of DSR 710 (for a respective pixel electrode 750) provides the other input. Inputs to arbitration gates, such as arbitration gate 732, include TX, TXH/L, and the Q output of a flip flop of DSR 710 (for a respective pixel electrode 750) provides the other input. Arbitration mechanism 1130 operates to allow only one excitation signal (VCOMDC or one of VCOMTXL or VCOMTXH) to be driven on any single pixel electrode 750 at a given time.

In one embodiment polarity control device comprises PSR 1140, XOR gates 1160, 1161, and 1162 and is configured to control the polarity of the signal for touch sensing. Further, in some embodiments, PSR 1140 comprises a plurality of multiplexers (e.g. 1142) and a plurality of flip flops (e.g. 1141) where PSTV is the digital input into PSR 1140 and TDIR is used to as the select for multiplexor 1142. In some embodiments, PSTV may be generated by and received from one or more integrated circuits and/or from a processing system, such as processing system 1210 of FIG. 12. Polarity control device utilizes the Q output of a flip flop (e.g., flip flop 1141) (for a respective pixel electrode 750) for a first input to an XOR gate (e.g. XOR gate 116) and TXH/L for the other input. In one embodiment, if the Q signal is high on an XOR gate (e.g., XOR gate 1160), then the output of the XOR gate will not change the polarity of the signal. In another embodiment, if the Q signal is low on an XOR gate (e.g., XOR gate 1160), then the output of the XOR gate will change the polarity of the signal.

The embodiment illustrated in FIG. 11 shows three Vcom signals (VCOMDC, VCOMTXH, VCOMTXL) and an extra TXH/L signal to select high (VCOMTXH) or low (VCOMTXL). The polarity control device is able to select an inverted VCOMTX signal locally using depending upon the input and whether or not a pixel electrode is guarded.

It is appreciated, that in any of the embodiments illustrated in FIGS. 7-11, that the circuitry depicted may be disposed upon on at least one glass substrate of an LCD (e.g., on a surface of color filter panel 140 of FIG. 1). In other embodiments, portions of the circuitry depicted may be included within one or more integrated circuits (IC). In further embodiments, all of the circuitry depicted may be included within one or more integrated circuits (IC).

Example Integrated Display and Touch Sensor Device

Figure 12:
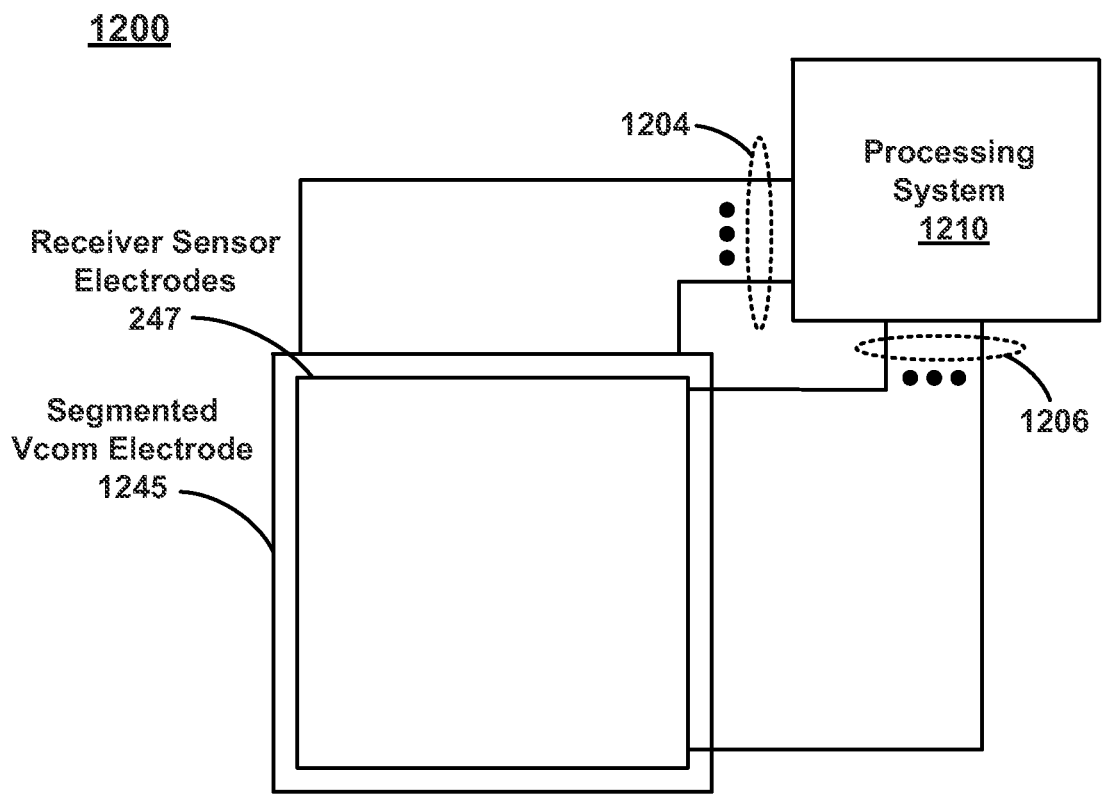
FIG. 12 is a plan view block diagram of an example integrated display and touch sensor device that can be implemented to include one or more embodiments of the present invention

FIG. 12 is a plan view block diagram of an example integrated display and touch sensor device 1200 that can be implemented to include one or more embodiments of the present invention. Integrated display and touch sensor device 1200 is interchangeably referred to herein as "device" 1200. Device 1200 can be utilized to communicate user input via an input object (e.g., a user's finger, a probe such as a stylus, and/or some other external input object) to a computing device or other electronic device.

When in operation, receiver sensor electrodes 247 and segmented Vcom electrode 245 are used in combination to form a "sensing region" for sensing input objects. "Sensing region" as used herein is intended to broadly encompass any space above, around, in and/or near device 1200 wherein the receiver sensor electrodes 247 are able to detect an input object. In one embodiment, a sensing region extends from a surface of receiver sensor electrodes 247 in one or more directions into space until the noise and decreased signal prevent accurate object detection. This distance may be on the order of less than a millimeter, millimeters, centimeters, or more, and may vary significantly with the type of position sensing technology used and the accuracy desired. Accordingly, the planarity, size, shape and exact locations of the particular sensing regions can vary widely from embodiment to embodiment. Further, even though "touch" may be used in describing some embodiments, "touch" is meant to encompass sensing objects in the "sensing region" to include sensing when objects are proximate to, but not directly touching device 1200.

Sensing regions with rectangular projected shape are common, and many other shapes are possible. For example, depending on the design of the sensor pattern and surrounding circuitry, shielding from any input objects, and the like, sensing regions can be made to have two-dimensional projections of other shapes. Similar approaches can be used to define the three-dimensional shape of the sensing region. For example, any combination of sensor design, shielding, signal manipulation, and the like can effectively define a sensing region in the third dimension.

Device 1200 can include a first set of a plurality of conductive routing traces 1204 and a second set of a plurality of conductive routing traces 1206 that are patterned (or formed) as part of device 1200. Conductive routing traces 1204 are utilized, in one embodiment, to communicatively couple processing system 1210 with sensor electrodes 1245 that are configured for performing both sensor functions and the display functions of a display device. In one embodiment, sensor electrodes 1245 are segments of a segmented Vcom as shown in FIGS. 2A-2C. Conductive routing traces 1206 are utilized, in one embodiment, to communicatively couple processing system 1210 with receiver sensor electrodes 247.

Receiver sensor electrodes 247 can be formed of a substantially transparent conductive material. Indium tin oxide (ITO) is one example of a substantially transparent conductive material that can be used to form one or more receiver sensor electrodes or conductive traces of receiver sensor electrodes 247. In FIGS. 1 and 12, a capacitive sensing reference surface or "cover layer" is not illustrated over receiver sensor electrodes 247, so as not to obscure other portions which are being discussed. However, it is appreciated that such a capacitive sensing reference surface, which may also be made of an optically clear material, may separate receiver sensor electrodes 247 from an input object. With reference to FIG. 1, in one embodiment, the capacitive sensing reference surface may be a polarizer, such as polarizer 110-2 of FIG. 1 when receiver sensor electrodes 247 are disposed on an opposite side of the polarizer 110-2 or on a layer below the polarizer 110-2, such as on color filter panel 140.

Referring again to FIG. 12, in one embodiment, processing system 1210 drives a first sensor electrode of sensor electrodes 1245 with an electrical signal to provide a common voltage for refreshing one or more display pixels of a display. Further, processing system 1220 drives a second sensor electrode of sensor electrodes 1245 with a second electrical signal to generate electrical signals on one or more receiver sensor electrode(s) 247 via a capacitive coupling. Processing system 1210 couples the one or more receiver sensor electrodes 247 to electronic circuits of processing system 1210 to acquire one or more measurements of capacitance with respect to the capacitive coupling between the sensor electrodes 1245 driven for touch sensing and the receiver sensor electrodes 247. In one embodiment, processing system 1210 may be coupled only to receiver sensor electrode(s) 247 but not to sensor electrodes 1245 (instead sensor electrodes 1245 may be driven by some other source such as a display driver). This driving from another source will still generate a signal on receiver sensor electrode(s) 247, which can be measured by processing system 1210 in the same manner described above in order to acquire a measurement of the capacitive coupling between the driven sensor electrodes 1245 and the receiver sensor electrodes 247.

Such measurement(s) of capacitance by processing system 1210 enable the sensing of input objects within the sensing region produced by the combination of sensor electrodes 1245 and receiver sensor electrodes 247. Such measurement(s) can also be utilized by processing system 1210, in some embodiments, to determine positional information with respect to an input object relative to the sensing region and display of device 1200. The positional information is relative to both the sensing region and the display, because the drive electrodes are integrated with the display and the sense electrodes are disposed over the display. Processing system 1210 may be implemented as one or more integrated circuits and/or discrete components. In one embodiment, processing system 1210 includes or is implemented within an application specific integrated circuit (ASIC). In accordance with the embodiments described herein, such an ASIC can include components and/or embedded logic instructions for performing capacitance measurement(s) and determining contact and/or positional information with respect to both a sensing region and display of device 1200.

The positional information determined by processing system 1210 can be any suitable indicia of object presence. For example, the processing system can be implemented to determine "zero-dimensional" 1-bit positional information (e.g., near/far or contact/no contact) or "one-dimensional" positional information as a scalar (e.g., position or motion along a sensing region). Processing system 1210 can also be implemented to determine multi-dimensional positional information as a combination of values (e.g., two-dimensional horizontal/vertical axes, three-dimensional horizontal/vertical/depth axes, angular/radial axes, or any other combination of axes that span multiple dimensions), and the like. Processing system 1210 can also be implemented to determine information about time or history.

Furthermore, the term "positional information" as used herein is intended to broadly encompass absolute and relative position-type information, and also other types of spatial-domain information such as velocity, acceleration, and the like, including measurement of motion in one or more directions. Various forms of positional information may also include time history components, as in the case of gesture recognition and the like. The positional information from the processing system 1210 facilitates a full range of interface inputs, including use of the proximity sensor device as a pointing device for cursor control, scrolling, and other functions.

It is noted that some example embodiments of patterns which may be used as receiver sensor electrodes 247 are described herein in FIGS. 3 and 4. It is also noted that some example embodiments of segmented Vcom electrode 1245 are illustrated in FIGS. 2A-2C and 4 as segmented Vcom electrode 245. It is appreciated that the examples of FIGS. 2A-2C, 3, and 4 are provided by way of example and not of limitation. In one embodiment, other sensor electrodes 1245 and receiver sensor electrode 247 patterns/combinations that provide zero-dimensional, one-dimensional, or two-dimensional sensing, and that follow the principles described herein, can also be used for measuring capacitance while a set of the sensor electrodes 1245 are also concurrently used for refreshing pixels of a display.

Example Methods of Integrated Capacitive Sensing and Displaying

The following discussion sets forth in detail the operation of example methods of operation of embodiments. With reference to FIGS. 13 and 14, flow diagrams 1300 and 1400 illustrate example procedures used by various embodiments. Flow diagrams 1300 and 1400 include some procedures that, in various embodiments, are carried out by a processor such as an ASIC under the control of computer-readable and computer-executable instructions. In this fashion, all or parts of flow diagrams 1300 and 1400 can be implemented using and/or receiving signals from a computer or processing system, such as processing system 1210, in various embodiments. The computer-readable and computer-executable instructions can reside in any tangible computer readable storage media, such as, for example, memory, logic, and/or silicon of or coupled with processing system 1210. These computer-readable and computer-executable instructions are used to control or operate in conjunction with, for example, some portion of processing system 1210, such as a processor or ASIC. Although specific procedures are disclosed in flow diagrams 1300 and 1400, such procedures are examples. That is, embodiments are well suited to performing various other procedures or variations of the procedures recited in flow diagrams 1300 and 1400 and described below. Likewise, in some embodiments, the procedures in flow diagrams 1300 and 1400 (along with those described below) may be performed in an order different than presented and/or not all of the procedures described in flow diagrams 1300 and/or 1400 may be performed.

FIG. 13 is a flow diagram 1300 of an example method of capacitive sensing in a display, according to an embodiment. Flow diagram 1300 describes a method of operation of an integrated display and touch sensor device 1200, according to one embodiment. Elements of flow diagram 1300 are described below, with reference to elements of FIGS. 1-12.

At 1310 of flow diagram 1300, in one embodiment, a sensor drive signal is received for driving a first at least one sensor electrode of a plurality of sensor electrodes. The plurality of sensor electrodes is disposed as a part of a display element of a display device and is configured for performing both sensor functions and display functions of the display device. With reference to FIGS. 7-11, in one embodiment, the sensor electrodes are pixel electrodes/ common voltage electrode segments 750 (e.g., 750-1, 750-2, 750-3 . . . ). In one embodiment, the sensor drive signal is received from a sensor drive mechanism, such as from an output (Q) of TSR 720. As has been previously described herein, the sensor drive signal may also be received from other sources, including: a memory bus, a processing system, and/or a state machine. For purposes of example, and not of limitation, in one embodiment, the sensor drive signal is received for driving pixel electrodes/common voltage electrode segments 750-1 and 750-2.

At 1320 of flow diagram 1300, in one embodiment, a display drive signal is received for driving a second at least one sensor electrode of the plurality of sensor electrodes. In one embodiment, the display drive signal is received from a display drive mechanism, such as from an output (Q) of DSR 710. For purposes of example, and not of limitation, in one embodiment, the display drive signal is received for driving pixel electrode/common voltage electrode segment 750-2.

At 1330 of flow diagram 1300, in one embodiment, the method includes arbitrating between the display drive signal and the sensor drive signal such that the display drive signal and the sensor drive signal are not simultaneously driven on any sensor electrode of the plurality of sensor electrodes. In one embodiment, an arbitration mechanism, such as arbitration mechanism 730 or arbitration mechanism 1130 is used to perform the arbitration in the manner previously described herein. It is appreciated that the arbitration may also be performed in software and/or firmware that is/are executed by a processing system, such as processing system 1210. In one embodiment, arbitration always defaults to allowing a display drive signal (for display refresh) to be driven on a sensor electrode if both a display drive signal and sensor drive signal are selected for the same sensor electrode. Following the previous example, in which both the sensor drive signal and display drive signal were received for pixel electrode/common voltage electrode segment 750-2, the arbitration will select the display drive signal to be driven.

At 1340 of flow diagram 1300, in one embodiment, the method of flow diagram 1300 further comprises inhibiting the sensor drive signal from being driven on a guarded set of the plurality of sensor electrodes. In one embodiment, a guard band control device such as GBSR 940, or a NAND gate, XOR gate, or OR gate (such as OR gate 1050) or other gate type logic is used to inhibit the sensor drive signal from being driven on a guarded set of the plurality of sensor electrodes.

At 1350 of flow diagram 1300, in one embodiment, the method of flow diagram 1300 further comprises controlling polarity of the sensor drive signal. In one embodiment, polarity control device (PSR 1140 and XOR gates 1160, 1161, and 1162) of FIG. 11 is used for controlling the polarity of the sensor drive signal. Reference is made to FIGS. 8 and 11 which both show polarity control by allowing either VCOMTXH or VCOMTXL to be selected as the polarity for a sensor drive signal on any particular pixel electrode/common voltage electrode segment 750 that is not guarded and/or selected for transmitting a display refresh signal (VCOMDC).

FIG. 14 is a flow diagram 1400 of an example method of capacitive sensing in a display, according to an embodiment. Flow diagram 1400 describes a method of operation of an integrated display and touch sensor device 1200, according to one embodiment. Elements of flow diagram 1400 are described below, with reference to elements of FIGS. 1-12.

At 1410 of flow diagram 1400, in one embodiment, a sense signal is driven on a first at least one sensor electrode of a plurality of sensor electrodes. The plurality of sensor electrodes is configured for performing both sensor functions and display functions of a display device. The sense signal is driven by a sensor drive mechanism comprising a memory element and the sensor drive mechanism is coupled with the first at least one sensor electrode of the plurality of sensor electrodes. The memory element is configured for selecting drive excitation information for the first at least one sensor electrode. With reference to FIGS. 7-11, in one embodiment, the sensor electrodes are pixel electrodes/common voltage electrode segments 750 (e.g., 750-1, 750-2, 750-3 . . . ). In one embodiment, the sensor drive signal is received from a sensor drive mechanism, such as from an output (Q) of TSR 720. For purposes of example, and not of limitation, in one embodiment, the sensor drive signal is received for driving pixel electrodes/common voltage electrode segments 750-1 and 750-2. In one embodiment, the sense signal which will be driven is VCOMTX (which may include VCOMTXH and VCOMTXL as previously described herein)

At 1420 of flow diagram 1400, in one embodiment, the a display signal is driven on a second sensor electrode of the plurality of sensor electrodes. The display signal is driven by a display drive mechanism coupled with the second sensor electrode. In one embodiment, the display drive signal is received from a display drive mechanism, such as from an output (Q) of DSR 710. For purposes of example, and not of limitation, in one embodiment, the display drive signal is received for driving pixel electrode 750-2. In one embodiment, the display signal to be driven is VCOMDC, as has been previously described herein.

At 1430 of flow diagram 1400, in one embodiment, the method of flow diagram 1400 further comprises arbitrating between the display signal and the sense signal such that the display signal and the sense signal are not simultaneously driven on any sensor electrode of the plurality of sensor electrodes. In one embodiment, an arbitration mechanism, such as arbitration mechanism (AM) 730 or AM 1130 is used to perform the arbitration in the manner previously described herein. It is appreciated that the arbitration may also be performed in software or firmware that is executed by a processing system, such as processing system 1210. In one embodiment, arbitration always defaults to allowing a display drive signal (for display refresh) to be driven on a sensor electrode if both a display drive signal and sensor drive signal are selected for the same sensor electrode. Following the previous example, in which both the sensor drive signal and display drive signal were received for pixel electrode/common voltage electrode segment 750-2, the arbitration will select the display drive signal to be driven.

At 1440 of flow diagram 1400, in one embodiment, the method of flow diagram 1400 further comprises inhibiting the sense signal from being driven on a guarded set of the plurality of sensor electrodes. This can include inhibiting the sensor signal from being driven on one or more sensor electrodes that surround a sensor electrode which is being used to drive a display drive signal. Such a guarded set of sensor electrodes is referred to herein as a guard band, and can assist in avoiding cross-coupling issues between touch and display by leaving one or more undriven sensor electrodes between a sensor electrode that is driven with a display drive signal and a sensor electrode that is driven with a sense signal. In one embodiment, a guard band control device such as GBSR 940, or OR gate 1050 is used to inhibit the sensor drive signal from being driven on a guarded set of the plurality of sensor electrodes. For purposes of example, in one embodiment, where a display drive signal is being driven on pixel electrode/common voltage electrode segment 750-2, pixel electrodes/common voltage electrode segments 750-1 and 750-2 will be included in the guarded set of sensor electrodes and the sensor drive signal will also be inhibited from being driven on pixel electrode/common voltage electrode segment 750-1.

At 1440 of flow diagram 1400, in one embodiment, the method of flow diagram 1400 further comprises controlling polarity of the sense signal. In one embodiment, a polarity control device of FIG. 11 is used for controlling the polarity of the sensor signal that is being driven. Reference is made to FIGS. 8 and 11 which both show polarity control by allowing either VCOMTXH or VCOMTXL to be selected as the polarity for a sensor signal on any particular pixel electrode/common voltage electrode segment 750 that is not guarded and/or selected for transmitting a display refresh signal (VCOMDC).

Figure 15B:
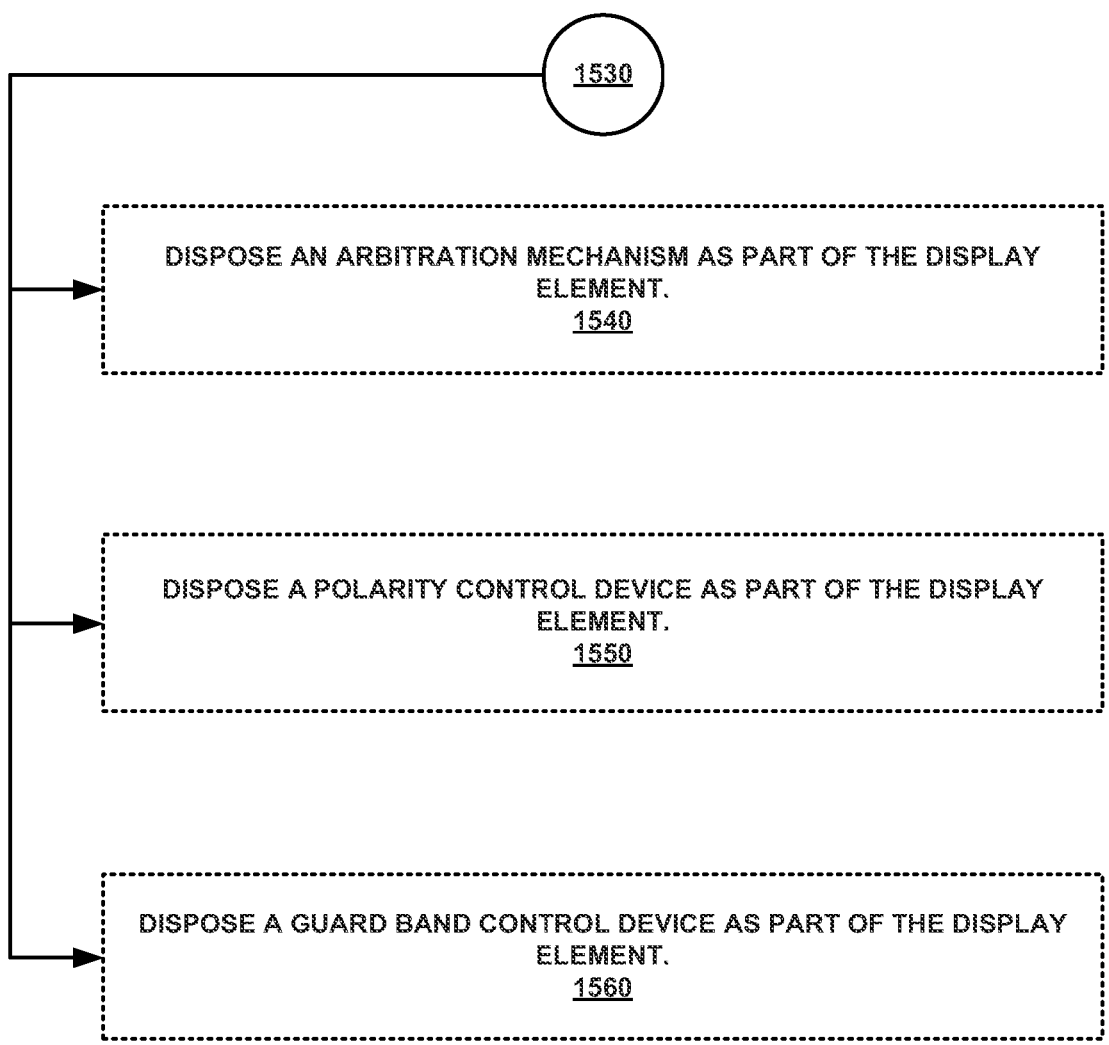

Example Method of Creating a Display Device having an Integrated Capacitive Proximity Sensor FIGS. 15A and 15B illustrate a flow diagram 1500 of an example method of creating a display device having an integrated proximity sensor, according to an embodiment. This can comprise providing, forming, and/or assembling all or a portion of the device as specified in the method.

At 1510 of flow diagram 1500, in one embodiment, a plurality of sensor electrodes is formed as part of a display element of the display device. The plurality of sensor electrodes is configured for performing both sensor functions and display functions of the display device. In one embodiment, this comprises forming pixel electrodes/common voltage electrode segments, such as pixel electrodes/common voltage electrode segments 750-1 and 750-2 that are illustrated in FIGS. 7-11. This may include etching and/or depositing material to form such sensor electrodes on a substrate element of a display, such as on a surface of a color filter panel of an LCD.

At 1520 of flow diagram 1500, in one embodiment, a sensor drive mechanism is disposed as part of the display element. The sensor drive mechanism is coupled with the plurality of sensor electrodes and configured for driving a first electrical signal on a first at least one sensor electrode of the plurality of sensor electrodes. The sensor drive mechanism comprises at least one memory element configured for selecting drive excitation information for the first least one sensor electrode. With reference to FIGS. 7-11, TSR 720 is one example of such a sensor drive mechanism which can be disposed by etching and/or depositing material on a substrate element of a display, such as on a surface of a color filter panel of an LCD. TSR 720 includes flip flops (e.g., flip flop 721) which is a memory element and a portion of a shift register. TSR 720 can select a sensor drive signal to be driven on one or more of the pixel electrodes/common voltage electrode segments 750-1 and 750-2. In other embodiments, a memory bus, or a coupling for coupling to a state machine may comprise the sensor drive mechanism that is disposed as part of the display element.

At 1530 of flow diagram 1500, in one embodiment, a display drive mechanism is disposed as part of the display element. The display drive mechanism coupled with a second a least one sensor electrode of the plurality of sensor electrodes and configured for driving a second electrical signal on the second at least one sensor electrode. With reference to FIGS. 7-11, DSR 710 is one example of such a display drive mechanism which can be disposed by etching and/or depositing material on a substrate element of a display, such as on a surface of a color filter panel of an LCD. DSR 710 includes flip flops (e.g., flip flop 721) which is a memory element. DSR can select a display drive signal to be driven on a pixel electrode/common voltage electrode segment 750.

At 1540 of flow diagram 1500, in one embodiment, the method of flow diagram 1500 further comprises disposing an arbitration mechanism as part of the display element. The arbitration mechanism is coupled with the plurality of sensor electrodes, the sensor drive mechanism, and the display drive mechanism. The arbitration mechanism is configured for arbitrating between the first electrical signal and the second electrical signal such that the first and second electrical signals are not simultaneously driven on any sensor electrode of the plurality of sensor electrodes. With reference to FIGS. 7-11, AM 730 and AM 1130 are two examples or arbitration mechanisms that can be disposed by etching and/or depositing material on a substrate element of a display, such as on a surface of a color filter panel of an LCD. As illustrated in FIGS. 7-11, AM 730 and AM 1130 include drive logic (e.g., display drive gate 731) and arbitration logic (e.g., arbitration gate 732). As previously described, AM 730 and AM 1130 arbitrate between a sensor drive signal and a display drive signal when both are selected to be driven on a sensor electrode at the same time.

At 1550 of flow diagram 1500, in one embodiment, the method of flow diagram 1500 further comprises disposing a polarity control device as part of the display element. The polarity control device is coupled with the sensor drive mechanism and configured for controlling polarity of the first electrical signal. With reference to FIGS. 8 and 11, examples of polarity control devices are shown. Polarity control devices 1140, 1160, 1161, and 1162 of FIG. 11 are examples of a polarity control device which can be disposed by etching and/or depositing material on a substrate element of a display, such as on a surface of a color filter panel of an LCD. The polarity control device, for example, can control the polarity of a sensor drive signal that is driven on pixel electrode/common voltage electrode segment 750-1.

At 1560 of flow diagram 1500, in one embodiment, the method of flow diagram 1500 further comprises disposing a guard band control device as part of the display element. The guard band control device is coupled with the plurality of sensor electrodes. The guard band control device is configured for inhibiting the sensor drive mechanism from driving the first electrical signal on a guarded set of the plurality of sensor electrodes. With reference to FIGS. 9 and 10 several examples of guard band control devices are shown and described. Guard band control devices such as GBSR 940, and OR gate 1050 are some examples of a guard band control devices which can be disposed by etching and/or depositing material on a substrate element of a display, such as on a surface of a color filter panel of an LCD. In one embodiment, a guard band control device such as GBSR 940, or OR gate 1050 is used to inhibit the sensor drive signal from being driven on a guarded set of the plurality of sensor electrodes. For purposes of example, in one embodiment, where a display drive signal is being driven on pixel electrode/common voltage electrode segment 750-2, pixel electrodes/common voltage electrode segments 750-1 and 750-2 will be included in the guarded set of sensor electrodes and the sensor drive signal will also be inhibited from being driven on pixel electrode/common voltage electrode segment 750-1.

The foregoing descriptions of specific embodiments have been presented for purposes of illustration and description. They are not intended to be exhaustive or to limit the presented technology to the precise forms disclosed, and obviously many modifications and variations are possible in light of the above teaching. The embodiments were chosen and described in order to best explain the principles of the presented technology and its practical application, to thereby enable others skilled in the art to best utilize the presented technology and various embodiments with various modifications as are suited to the particular use contemplated. It is intended that the scope of the present technology be defined by the claims appended hereto and their equivalents.

What is claimed is:

1. A display device having an integrated capacitive proximity sensor, said display device comprising:
   a plurality of common voltage (VCOM) electrode segments comprising a first VCOM electrode segment and a second VCOM electrode segment,
   wherein the plurality of VCOM electrode segments is disposed as part of a display element of the display device, and
   wherein the plurality of VCOM electrode segments is configured for performing both transmitter sensor electrode functions of a transcapacitive sensor and VCOM electrode display functions of the display device;
   a first display drive gate;
   a first plurality of sub-pixel transistors comprising:
      a plurality of drains coupled to the first VCOM electrode segment; and
      a plurality of gates coupled to an output of the first display drive gate;
   a sensor drive mechanism comprising a first row output configured to select the first VCOM electrode segment to perform the transmitter electrode functions;
   a display drive mechanism comprising a first row output for driving the first display drive gate; and
   an arbitration mechanism configured to prevent a sensor drive signal and a display drive signal from being simultaneously driven on the first VCOM electrode segment, the arbitration mechanism comprising:
      a first arbitration gate driven by the first output row of the sensor drive mechanism; and
      a first plurality of transistors that drive, based on an output of the first arbitration gate, the first VCOM electrode segment with only one of the sensor drive signal and the display drive signal.

2. The display device of claim 1, further comprising:
   a polarity control device coupled with the sensor drive mechanism and configured for controlling polarity of the sensor drive signal.

3. The display device of claim 1, further comprising:
   a second display drive gate;
   a second plurality of sub-pixel transistors coupled to the second VCOM electrode segment and an output of the second display drive gate,
   wherein the sensor drive mechanism further comprises a second row output configured to select the second VCOM electrode segment to perform the transmitter electrode functions,
   wherein the display drive mechanism further comprises a second row output for driving the second display drive gate, and
   wherein the arbitration mechanism further comprises:
      a second arbitration gate driven by the second row output of the sensor drive mechanism; and
      a second plurality of transistors that drive, based on an output of the second arbitration gate, the second VCOM electrode segment with only one of the sensor drive signal and the display drive signal; and
   a guard band control device comprising:
      a first row output further driving the first arbitration gate; and
      a second row output further driving the second arbitration gate to inhibit the sensor drive mechanism from driving the sensor drive signal on a guarded set of the plurality of VCOM electrode segments comprising the second VCOM electrode segment when the display drive signal is driven on the first VCOM electrode segment.

4. The display device of claim 1, wherein the sensor drive mechanism comprises a shift register configured for providing the first row output of the sensor drive mechanism.

5. The display device of claim 1, wherein the sensor drive mechanism comprises a memory bus configured for providing the first row output of the sensor drive mechanism.

6. The display device of claim 1, wherein the sensor drive mechanism comprises a state machine configured for providing the first row output of the sensor drive mechanism.

7. The display device of claim 1, wherein the first arbitration gate is coupled to the first row output of the display drive mechanism.

8. The display device of claim 7, wherein the arbitration mechanism further comprises an OR gate that couples the first row output of the display drive mechanism to the first arbitration gate.

9. The display device of claim 7, wherein the first row output of the display drive mechanism is directly connected to the arbitration gate.

10. A method of integrated capacitive sensing and displaying, said method comprising:
    driving a first display drive gate by a first row output of a display drive mechanism,
       wherein the first display drive gate comprises an output coupled to a plurality of gates of a first plurality of sub-pixel transistors, and
       wherein the first plurality of sub-pixel transistors comprises a plurality of drains coupled to the first sensor electrode of a plurality of sensor electrodes,
       wherein the plurality of sensor electrodes is disposed as a part of a display element of a display device and is configured for performing both transmitter sensor electrode functions of a transcapacitive sensor and common voltage (VCOM) electrode display functions of said display device;
    driving a first arbitration gate of an arbitration mechanism by a first row output of a sensor drive mechanism,
       wherein the first row output of the sensor drive mechanism is configured to select the first sensor electrode to perform the transmitter sensor electrode functions;
    driving, by a first plurality of transistors of the arbitration mechanism and based on an output of the first arbitration gate, the first sensor electrode with only one of a display drive signal and a sensor drive signal such that the display drive signal and the sensor drive signal are not simultaneously driven on the first sensor electrode of the plurality of sensor electrodes.

11. The method of claim 10, wherein the first row output of the display drive mechanism is configured to select the first VCOM electrode segment to perform the VCOM electrode display functions.

12. The method of claim 11, further comprising:
driving a second display drive gate by a second row output of a display drive mechanism,
wherein the second display drive gate comprises an output coupled to a second plurality of sub-pixel transistors, and
wherein the second plurality of sub-pixel transistors are further coupled to a second sensor electrode of a plurality of sensor electrodes;
driving the first arbitration gate with a first row output of a guard band control device; and
driving a second arbitration gate of the arbitration mechanism with:
  a second row output of the sensor drive mechanism, wherein the second row output of the sensor drive mechanism is configured to select the second sensor electrode to perform the transmitter sensor electrode functions; and
  a second row output of the guard band control device to inhibit the sensor drive signal from being driven on a guarded set of said plurality of sensor electrodes comprising the second sensor electrode when the display drive signal is driven on the first sensor electrode.

13. The method of claim 11, further comprising:
controlling polarity of the sensor drive signal.

14. A method of creating a display device having an integrated capacitive proximity sensor, said method comprising:
forming a plurality of sensor electrodes comprising a first sensor electrode and a second sensor electrode as part of a display element of said display device,
wherein the plurality of sensor electrodes is configured for performing both transmitter sensor electrode functions of a transcapacitive sensor and common voltage electrode display functions of the display device;
disposing a first display gate;
disposing a first plurality of sub-pixel transistors comprising:
  a plurality of drains coupled to the first sensor electrode; and
  a plurality of gates coupled to an output of the first display drive gate;
disposing a sensor drive mechanism as part of the display element and comprising a first row output configured to select the first sensor electrode to perform the transmitter electrode functions;
disposing a display drive mechanism as part of the display element and comprising a first row output for driving the first display drive gate; and
disposing an arbitration mechanism as part of the display element and configured to prevent a sensor drive signal and a display drive signal from being simultaneously driven the first sensor electrode, the arbitration mechanism comprising:
  a first arbitration gate driven by the first output row of the sensor drive mechanism; and
  a first plurality of transistors that drive, based on an output of the first arbitration gate, the first sensor electrode segment with only one of the sensor drive signal and the display drive signal.

15. The method of claim 14, further comprising:
disposing a polarity control device as part of the display element, the polarity control device configured for controlling polarity of said sensor drive signal.

16. The method of claim 14, further comprising:
disposing a second display drive gate as part of the display element;
disposing a second plurality of sub-pixel transistors coupled to the second sensor electrode and an output of the second display drive gate,
wherein the sensor drive mechanism further comprises a second row output for selecting the second sensor electrode to perform the transmitter electrode functions,
wherein the display drive mechanism further comprises a second row output for driving the second display drive gate, and
wherein the arbitration mechanism further comprises:
  a second arbitration gate driven by the second row output of the sensor drive mechanism; and
  a second plurality of transistors that drive, based on an output of the second arbitration gate, the second sensor electrode with only one of the sensor drive signal and the display drive signal; and
disposing a guard band control device as part of the display element, the guard band control device comprising:
  a first row output further driving the first arbitration gate; and
  a second row output further driving the second arbitration gate to inhibit the sensor drive mechanism from driving the sensor drive signal on a guarded set of said plurality of sensor electrodes comprising the second sensor electrode when the display drive signal is driven on the first sensor electrode.

17. The method of claim 14, wherein said disposing a sensor drive mechanism as part of said display element comprises:
disposing said at least one memory element as part of a shift register, said shift register configured for providing said excitation information.

* * * * *